US012750466B2

(12) United States Patent
Park et al.

(10) Patent No.: US 12,750,466 B2
(45) Date of Patent: Sep. 29, 2026

(54) ELECTRONIC DEVICE FOR DISPLAYING IMAGE AND OPERATING METHOD OF ELECTRONIC DEVICE

(71) Applicant: Samsung Electronics Co., Ltd., Suwon-si (KR)

(72) Inventors: Jaesung Park, Suwon-si (KR); Youngsu Moon, Suwon-si (KR); Junghwa Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/094,457

(22) Filed: Mar. 28, 2025

(65) Prior Publication Data

US 2025/0227210 A1 Jul. 10, 2025

Related U.S. Application Data

(63) Continuation of application No. PCT/KR2023/014844, filed on Sep. 26, 2023.

(30) Foreign Application Priority Data

Sep. 30, 2022 (KR) ........................ 10-2022-0125409
Feb. 17, 2023 (KR) ........................ 10-2023-0021575

(51) Int. Cl.
*H04N 9/31* (2006.01)

(52) U.S. Cl.
CPC ......... *H04N 9/3182* (2013.01); *H04N 9/3194* (2013.01)

(58) Field of Classification Search
CPC ........................... H04N 9/3182; H04N 9/3194
See application file for complete search history.

(56) References Cited

U.S. PATENT DOCUMENTS 8,436,942 B2 5/2013 Kanda
9,299,297 B2 3/2016 Shibamiya et al.
(Continued)

FOREIGN PATENT DOCUMENTS

JP 2009290828 A 12/2009
JP 2011237690 A 11/2011
(Continued)

OTHER PUBLICATIONS

International Search Report and Written Opinion of the ISA for PCT/KR2023/014844, mailed Jan. 4, 2024, 9 pages.

*Primary Examiner* — Yassin Alata
(74) *Attorney, Agent, or Firm* — Nixon & Vanderhye, P.C.

(57) ABSTRACT

The present disclosure includes an electronic device for displaying an image and an operating method of the electronic device. The electronic device includes: an image display unit comprising circuitry configured to display an image, a memory in which at least one instruction is stored, and at least one processor, comprising processing circuitry, individually and/or collectively, configured to execute the at least one instruction stored in the memory, and to: obtain an input image through an input/output interface, detect an optical flow indicating movement of an object included in the input image, based on a power control signal being obtained by executing a battery check module stored in the memory, and operate in a low-power mode in which a luminance of an image generated based on the input image is adjusted to be lowered, based on a magnitude and a direction of the detected optical flow.

20 Claims, 20 Drawing Sheets

(56) References Cited

U.S. PATENT DOCUMENTS

| | | | | |
|---|---|---|---|---|
| 9,953,615 | B2 | 4/2018 | Kwon | |
| 10,948,809 | B2 | 3/2021 | Kimoto et al. | |
| 11,295,641 | B2 | 4/2022 | Lee et al. | |
| 2011/0279732 | A1 * | 11/2011 | Kanda ...................... | H04N 5/57 348/E5.119 |
| 2023/0274467 | A1 | 8/2023 | Sugimoto et al. | |

FOREIGN PATENT DOCUMENTS

| | | | |
|---|---|---|---|
| JP | 2013137407 | A | 7/2013 |
| JP | 2014048490 | A | 3/2014 |
| JP | 2014212467 | A | 11/2014 |
| JP | 5807546 | B2 | 9/2015 |
| JP | 2016081108 | A | 5/2016 |
| JP | 2019117307 | A | 7/2019 |
| JP | 2021022538 | A | 2/2021 |
| KR | 20160046983 | A | 5/2016 |
| KR | 20160116576 | A | 10/2016 |
| KR | 20190064039 | A | 6/2019 |
| KR | 20200010952 | A | 1/2020 |
| WO | 2022013920 | A1 | 1/2022 |

* cited by examiner

FIG. 12

1200

| | | | | | |
|---|---|---|---|---|---|
| 0 | 0 | 0.4 | 0.4 | 0 | 0 |
| 0 | 0.1 | 0.5 | 0.5 | 0.6 | 0 |
| 0 | 0.1 | 0.4 | 0.75 | 0.1 | 0 |
| 0 | 0 | 0.5 | 0.6 | 0.8 | 0 |

FIG. 13

1300

| | | | | | |
|---|---|---|---|---|---|
| 0.1 | 0.1 | 0.5 | 0.3 | 0.1 | 0.1 |
| 0.1 | 0.1 | 0.4 | 0.5 | 0.6 | 0.1 |
| 0.1 | 0.1 | 0.4 | 0.6 | 0.1 | 0.1 |
| 0.1 | 0.1 | 0.3 | 0.6 | 0.8 | 0.1 |

FIG. 14

1400

| | | | | | |
|---|---|---|---|---|---|
| 0.075 | 0.075 | 0.475 | 0.325 | 0.1 | 0.075 |
| 0.075 | 0.1 | 0.425 | 0.5 | 0.6 | 0.075 |
| 0.075 | 0.1 | 0.4 | 0.636 | 0.1 | 0.075 |
| 0.075 | 0.075 | 0.35 | 0.6 | 0.8 | 0.075 |

ELECTRONIC DEVICE FOR DISPLAYING IMAGE AND OPERATING METHOD OF ELECTRONIC DEVICE

CROSS-REFERENCE TO RELATED APPLICATIONS

This application is a continuation of International Application No. PCT/KR2023/014844 designating the United States, filed on Sep. 26, 2023, in the Korean Intellectual Property Receiving Office and claiming priority to Korean Patent Application Nos. 10-2022-0125409, filed on Sep. 30, 2022, and 10-2023-0021575, filed on Feb. 17, 2023, in the Korean Intellectual Property Office, the disclosures of each of which are incorporated by reference herein in their entireties.

BACKGROUND

Field

The disclosure relates to an electronic device and an operating method thereof, and for example, to an electronic device for displaying an image and an operating method of the electronic device.

Description of Related Art

With the advancement of electronic technology, various types of electronic devices have been developed and distributed and various functions have been added to electronic devices.

Accordingly, power consumption of electronic devices has also increased, and thus, it has become important to reduce power consumption of electronic devices. Also, with the advancement of technology, mobile electronic devices including batteries, etc. have been developed, and methods for increasing the usage time of electronic devices have also been developed.

SUMMARY

An electronic device for displaying an image according to an example embodiment of the present disclosure may include: an image display unit comprising circuitry configured to display an image; a memory in which at least one instruction is stored; at least one processor, comprising processing circuitry, individually and/or collectively, configured to execute the at least one instruction stored in the memory and to control the electronic device to: obtain an input image through an input/output interface; detect an optical flow indicating movement of an object included in the input image, based on a power control signal being obtained by executing a battery check module stored in the memory; and operate in a low-power mode in which a luminance of an image generated based on the input image is adjusted to be lowered, based on a magnitude and a direction of the detected optical flow.

A method of operating an electronic device for displaying an image according to an example embodiment may include: obtaining an input image through an input/output interface; detecting an optical flow indicating movement of an object included in the input image, based on a power control signal being obtained by executing a battery check module stored in a memory; and operating in a low-power mode in which a luminance of an image generated based on the input image is adjusted to be lowered, based on a magnitude and a direction of the detected optical flow.

According to an example embodiment of the present disclosure, there may be provided a non-transitory computer-readable recording medium having recorded thereon a program for performing at least one of various embodiments of the operating method on a computer.

BRIEF DESCRIPTION OF THE DRAWINGS

The above and other aspects, features and advantages of certain embodiments of the present disclosure will be more apparent from the following detailed description, taken in conjunction with the accompanying drawings, in which reference numerals denote structural elements and in which:

FIG. 12 is a diagram illustrating a first flow map, according to various embodiments;

FIG. 13 is a diagram illustrating a second flow map, according to various embodiments;

FIG. 14 is a diagram illustrating a final flow map, according to various embodiments;

DETAILED DESCRIPTION

Figure 1:
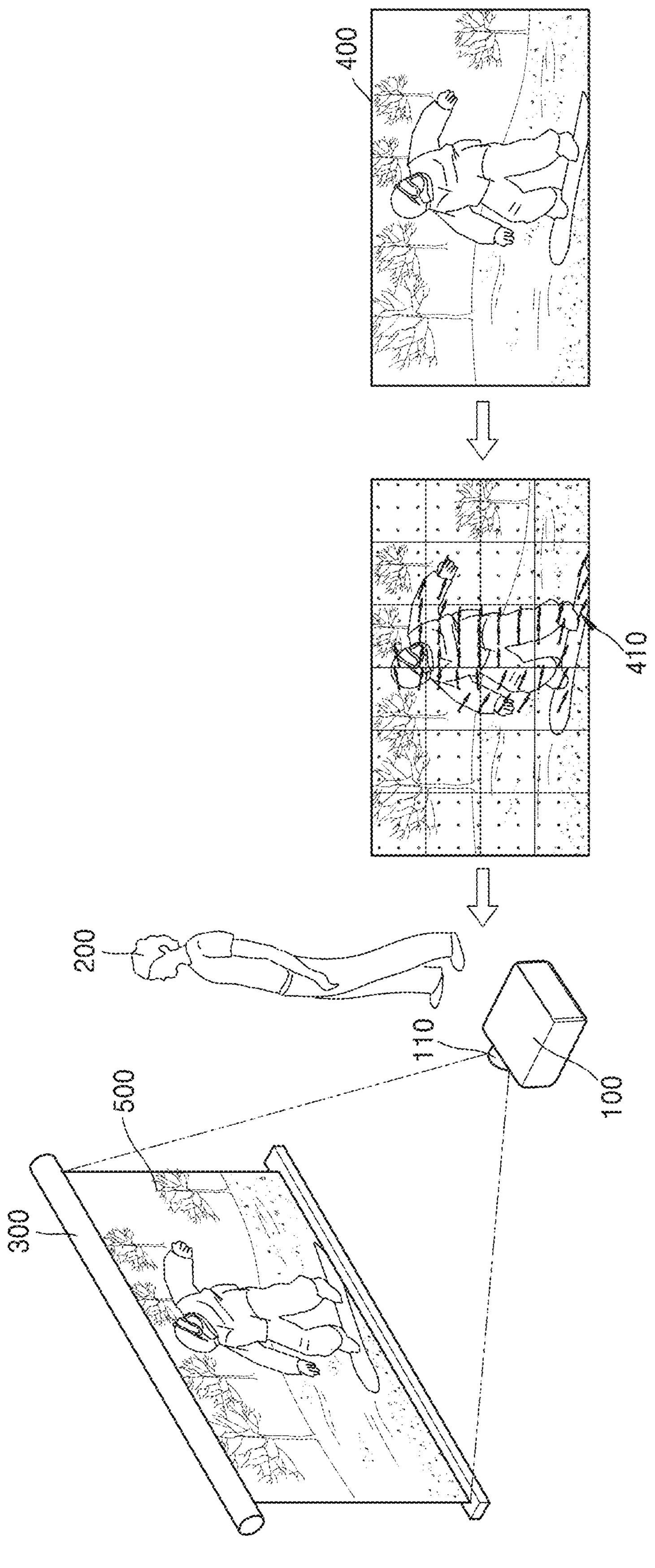
FIG. 1 is a diagram for illustrating an example electronic device, according to various embodiments.

The terms used herein will be briefly described, and various embodiments of the present disclosure will be described in greater detail.

The terms used herein are general terms currently widely used in the art in consideration of functions of the present disclosure, but the terms may vary according to the intention of one of ordinary skill in the art, precedents, or new technology in the art. Some terms may be arbitrarily selected, and in this case, the meaning of the selected terms will be described in detail in the detailed description of the present disclosure. Accordingly, the terms used herein should be defined based on the unique meanings thereof and the whole context of the present disclosure.

The singular forms "a," "an," and "the" are intended to include the plural forms as well, unless the context clearly indicates otherwise. The terms used herein, including technical or scientific terms, may have the same meaning as commonly understood by one of ordinary skill in the art described in the present disclosure.

When a portion "includes" an element, another element may be further included, rather than excluding the existence of the other element, unless otherwise described. Also, the terms such as " . . . unit" or "module" refer to units that perform at least one function or operation, and the units may be implemented as hardware or software or as a combination of hardware and software.

According to the situation, the expression "configured to" used herein may be used as, for example, the expression "suitable for", "having the capacity to", "designed to", "adapted to", "made to", or "capable of". The term "configured (or set) to" does not always refer only to "specifically designed to" in hardware. Instead, the expression "a system configured to" may refer, for example, to the system being "capable of" operating together with another device or other parts. For example, "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

In the present disclosure, it will be understood that when elements are "connected" or "coupled" to each other, the elements may be directly connected or coupled to each other, but may alternatively be connected or coupled to each other with an intervening element therebetween, unless specified otherwise.

Various embodiments of the present disclosure will now be described more fully with reference to the accompanying drawings. However, the present disclosure may be implemented in many different forms and is not limited to the various embodiments described herein. In the drawings, parts irrelevant to the description may be omitted in order to clearly describe the present disclosure, and like reference numerals denote like elements throughout the present disclosure.

Hereinafter, various example embodiments of the present disclosure will be described in greater detail with reference to the drawings.

FIG. 1 is a diagram illustrating an example electronic device, according to various embodiments.

Referring to FIG. 1, an electronic device 100 may provide an image 500 to a user 200. In an embodiment, the electronic device 100 may include an image display unit (e.g., a projector) 110 for displaying the image 500. The electronic device 100 may provide the image 500 to the user 200 through the image display unit 110.

In an embodiment, in FIG. 1, the electronic device 100 may include a projector that projects the image 500 into a projection space. In an embodiment, the electronic device 100 may provide the image 500 to the user 200 by projecting the image 500 onto a screen 300. In an embodiment, the electronic device 100 may be fixed or mobile.

However, the present disclosure is not limited thereto. The electronic device 100 may be any of various electronic devices such as a mobile device, a smartphone, a laptop computer, a desktop, a tablet PC, a digital broadcasting terminal, a wearable device, or the like, including various circuitry. In an embodiment, the electronic device 100 may provide the image 500 to the user 200 by displaying the image 500 through a display. The following will be described assuming that the electronic device 100 is a projector that projects the image 500 to the screen 300.

In an embodiment, the electronic device 100 may obtain an input image 400. The electronic device 100 may generate the image 500 based on the input image 400, and may provide the image 500 to the user 200 by projecting the generated image 500 to the screen 300 through the image display unit 110.

In an embodiment, the electronic device 100 may generate the image 500 based on the input image 400 received through an input/output interface. The electronic device 100 may generate the image 500, which may be displayed through the image display unit 110, based on the received input image 400, and may display the generated image 500 on the screen 300.

In an embodiment, the electronic device 100 may include a power supply unit (e.g., including a power supply). The electronic device 100 may check a charge amount charged in the power supply unit, and when the checked charge amount is equal to or less than a preset charge amount, the electronic device 100 may operate in a low-power mode. In an embodiment, the electronic device 100 may operate in the low-power mode by obtaining a power control signal generated when the checked charge amount is equal to or less than the preset (e.g., specified) charge amount. In an embodiment, when the checked charge amount is greater than the preset charge amount, the electronic device 100 may operate in a normal mode. In an embodiment, the low-power mode may be a mode in which the amount of power consumed by the electronic device 100 is smaller than that in the normal mode.

In an embodiment, the power supply unit may include a battery. The electronic device 100 may check a charge amount charged in the battery, and may determine whether to operate in the low-power mode by comparing the checked charge amount with the preset charge amount.

However, the present disclosure is not limited thereto. The electronic device 100 may obtain a power control signal from the outside and may operate in the low-power mode according to the obtained power control signal. In an embodiment, the electronic device 100 may receive an input that selects the low-power mode as an operation mode of the electronic device 100 from the user 200 through a user interface, and may obtain a power control signal based on the input of the user 200.

In an embodiment, the electronic device 100 may provide the image 500 in a state where the electronic device 100 is electrically connected to an external power supply device. The electronic device 100 may receive power from the external power supply device. In a state where the electronic device 100 receives power from the external power supply device, the electronic device 100 may operate in the low-power mode to reduce power consumption.

In an embodiment, a luminance of the image 500 when the electronic device 100 operates in the normal mode and a luminance of the image 500 when the electronic device 100 operates in the low-power mode may be different from each other. In an embodiment, a luminance of the image 500 when the electronic device 100 operates in the low-power mode may be lower than a luminance of the image 500 when the electronic device 100 operates in the normal mode. The electronic device 100 may display the image 500 by lowering a luminance of the image 500 to reduce power consumption and increase a usage time of the battery.

In an embodiment, the electronic device 100 may detect an optical flow 410 of the obtained input image 400, in the low-power mode. The optical flow may include information about movement of an object included in the input image 400. In an embodiment, when the input image 400 includes a plurality of frame images respectively corresponding to a plurality of frames, the optical flow 410 may include information about a movement direction and a movement distance of the object included in the input image 400 during the plurality of frames. In an embodiment, a direction of the optical flow 410 may correspond to a movement direction of the object included in the input image 400 during the plurality of frames. In an embodiment, a magnitude of the optical flow 410 may correspond to a magnitude of a movement distance of the object included in the input image 400 during the plurality of frames. In an embodiment, the optical flow 410 may be detected based on two frame images corresponding to two adjacent frames.

In an embodiment, the electronic device 100 may adjust a luminance of the image 500 based on the detected optical flow 410. In the low-power mode, the electronic device 100 may adjust a luminance of the image 500 to be lowered, based on a magnitude and a direction of the detected optical flow 410. In this case, a luminance change amount, which is a criterion for the user 200 to perceive a luminance reduction of the image 500, may be defined as a reference change amount. In an embodiment, even when a luminance of the image 500 is lowered in the low-power mode, if a difference between a luminance of the image 500 in the normal mode and a luminance of the image 500 in the low-power mode is less than the reference change amount, a luminance reduction of the image 500 may not be perceived by the user 200. Accordingly, power consumption of the electronic device 100 may be reduced, a usage time of the battery may be increased, and image quality degradation of the image 500 may be prevented or reduced from being perceived by the user 200.

In an embodiment, according to visual perception characteristics of a person, a magnitude of the reference change amount may increase as a magnitude of the optical flow 410 increases. The electronic device 100 may increase a degree of lowering a luminance of the image 500 in the low-power mode as a magnitude of the detected optical flow 410 increases. In an embodiment, as a magnitude of the optical flow 410 decreases, a magnitude of the reference change amount may decrease. The electronic device 100 may reduce a degree of lowering a luminance of the image 500 in the low-power mode as a magnitude of the detected optical flow 410 decreases.

In an embodiment, according to visual perception characteristics of a person, a magnitude of the reference change amount may increase as uniformity in a direction of the optical flow 410 decreases. The electronic device 100 may increase a degree of lowering a luminance of the image 500 as uniformity in a direction of the detected optical flow 410 decreases. In an embodiment, a magnitude of the reference change amount may decrease as uniformity in a direction of the optical flow 410 increases. The electronic device 100 may reduce a degree of lowering a luminance of the image 500 in the low-power mode as uniformity in a direction of the detected optical flow 410 increases.

Accordingly, the electronic device 100 may reduce power consumption, increase a usage time of the battery, and prevent and/or reduce image quality degradation of the image 500 perceived by the user 200 by varying a degree of lowering a luminance of the image 500 in the low-power mode according to the content and type of content included in the image 500.

In an embodiment, the electronic device 100 may generate a first flow map indicating a magnitude of the detected optical flow 410 and a second flow map indicating a direction of the detected optical flow 410. The electronic device 100 may generate a final flow map based on the first flow map and the second flow map. The electronic device 100 may determine a degree of lowering a luminance of the image 500 according to the final flow map. In an embodiment, the electronic device 100 may generate the final flow map by multiplying the first flow map by a first weight and multiplying the second flow map by a second weight.

In an embodiment, the electronic device 100 may generate the final flow map by making a magnitude of the first weight and a magnitude of the second weight different from each other. The electronic device 100 may make a magnitude of the first weight greater than a magnitude of the second weight in order to increase the importance of a magnitude of the detected optical flow 410 in lowering a luminance of the image 500. The electronic device 100 may make a magnitude of the second weight greater than a magnitude of the first weight in order to increase the importance of a direction of the detected optical flow 410 in lowering a luminance of the image 500.

The first flow map, the second flow map, and the final flow map will be described in greater detail below.

In an embodiment, the electronic device 100 may display the image 500 by adjusting a contrast ratio of the image 500, based on a magnitude and a direction of the detected optical flow 410, in the low-power mode. In an embodiment, the electronic device 100 may display the image 500 by adjusting a contrast ratio of the image 500 according to the final flow map, in the low-power mode. In an embodiment, the electronic device 100 may display the image 500 by lowering a luminance of the image 500 and increasing a contrast ratio of the image 500 according to the final flow map. According to visual perception characteristics of a person, when a luminance of the image 500 is lowered but a contrast ratio of the image 500 is increased, the user 200 may clearly see the image 500. Accordingly, the electronic device 100 may reduce power consumption of the electronic device 100 and may prevent and/or reduce image quality degradation of the image 500 in the low-power mode.

In an embodiment, the electronic device 100 may display the image 500 by adjusting a color of the image 500, based on a magnitude and a direction of the detected optical flow 410, in the low-power mode. In an embodiment, the electronic device 100 may display the image 500 by adjusting a color of the image 500, according to the final flow map in the low-power mode. In an embodiment, the electronic device 100 may display the image 500 by lowering a luminance of the image 500 and adjusting a color of the image 500 according to the final flow map. In an embodiment, a degree of adjusting a color of the image 500 may correspond to a degree of lowering a luminance of the image 500. A gray value corresponding to a color of the image 500 may be adjusted to is increased as a luminance of the image 500 is lowered. According to visual perception characteristics of a person, when a luminance of the image 500 is lowered but a gray value of the image 500 is increased, the user 200 may clearly see the image 500. Accordingly, the electronic device 100 may reduce power consumption of the electronic device 100 and may prevent and/or reduce image quality degradation of the image 500 in the low-power mode.

In an embodiment, the electronic device 100 may display the image 500 by adjusting a frame rate at which the image 500 is displayed based on a magnitude and a direction of the detected optical flow 410, in the low-power mode. In an embodiment, the electronic device 100 may display the image 500 by adjusting a frame rate at which the image 500 is displayed, according to the final flow map. In an embodiment, the electronic device 100 may display the image 500 by lowering a luminance of the image 500 and adjusting a frame rate at which the image 500 is displayed according to the final flow map. In an embodiment, a degree of adjusting a frame rate at which the image 500 is displayed may correspond to a degree of lowering a luminance of the image 500. A degree of increasing a frame rate at which the image 500 is displayed may be adjusted to be increased as a luminance of the image 500 is lowered. As movement of the object included in the input image 400 increases, visibility of the user 200 may be increased by increasing a frame rate. Accordingly, the electronic device 100 may reduce power consumption of the electronic device 100 and may prevent and/or reduce image quality degradation of the image 500 in the low-power mode.

In an embodiment, the electronic device 100 may display the image 500 by lowering a luminance of the image 500 and adjusting at least one of a contrast ratio or a color of the image 500, according to the final flow map, in the low-power mode. In an embodiment, the electronic device 100 may display the image 500 by lowering a luminance of the image 500 and adjusting a frame rate at which the image 500 is displayed, according to the final flow map. In an embodiment, the electronic device 100 may display the image 500 by lowering a luminance of the image 500, adjusting a frame rate at which the image 500 is displayed, and adjusting at least one of a contrast ratio or a color of the image 500, according to the final flow map.

Figure 2:
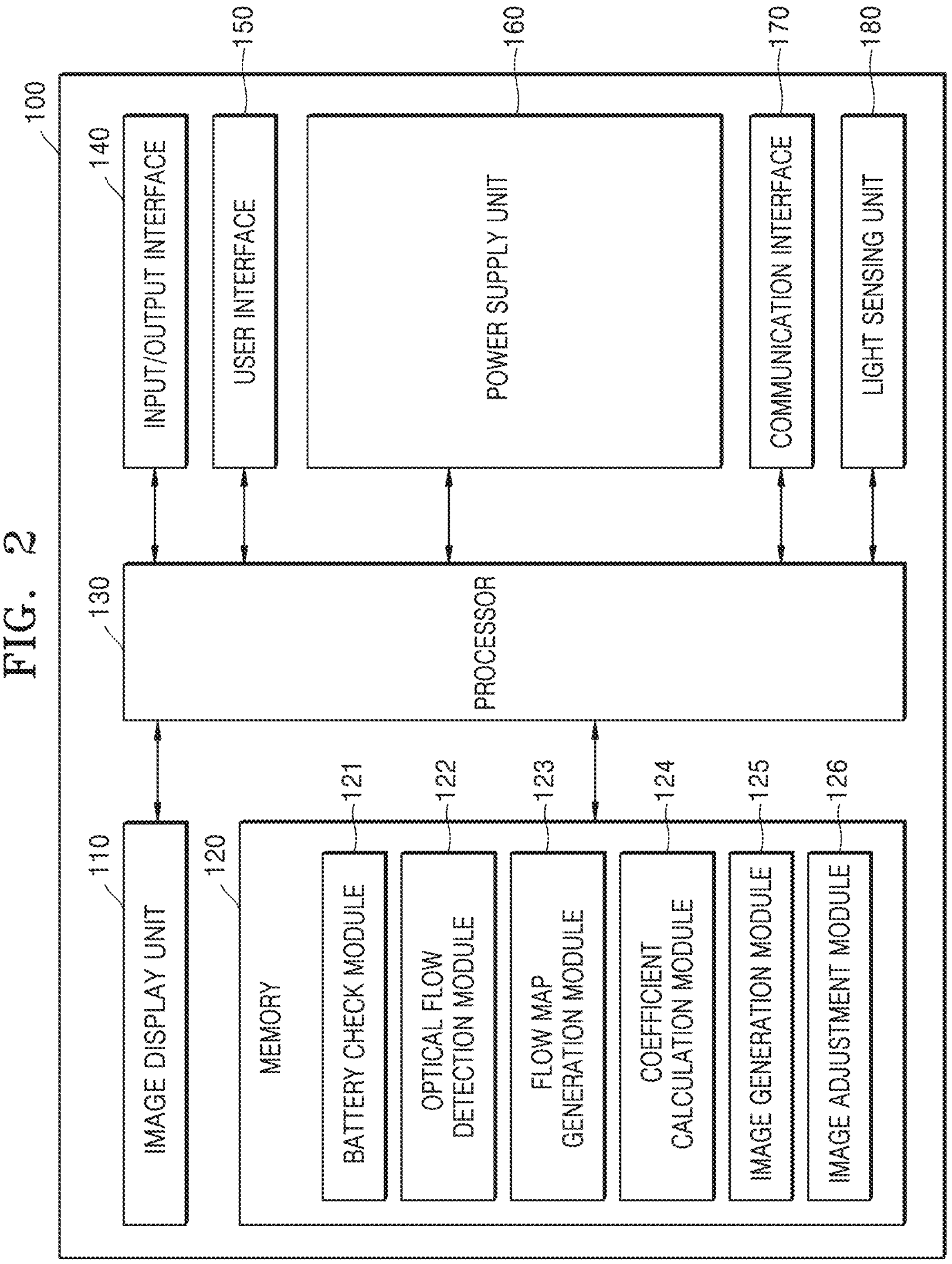
FIG. 2 is a block diagram illustrating an example configuration of an electronic device, according to various embodiments.

FIG. 2 is a block diagram illustrating an example configuration of an electronic device, according to various embodiments.

Referring to FIGS. 1 and 2, in an embodiment, the electronic device 100 may include the image display unit (e.g., including circuitry, e.g., a projector) 110, a memory 120, at least one processor (e.g., including processing circuitry) 130, an input/output interface (e.g., including input/output circuitry) 140, a user interface (e.g., including user interface circuitry) 150, a power supply unit (e.g., including a power supply) 160, a communication interface (e.g., including communication circuitry) 170, and a light sensing unit (e.g., including a sensor or sensing circuitry) 180. However, not all of elements illustrated in FIG. 2 are essential elements. The electronic device 100 may include more or fewer elements than those illustrated in FIG. 2. The image display unit 110, the memory 120, the at least one processor 130, the input/output interface 140, the user interface 150, the power supply unit 160, the communication interface 170, and the light sensing unit 180 may be electrically and/or physically connected to each other.

In an embodiment, the image display unit 110 may include various circuitry, such as a projector, and is an element that generates light for displaying the image 500 and projects the image 500 to the screen 300, and thus may be referred to as a projection unit or a projector. The image display unit 110 may include various sub-elements such as a light source, a projection lens, and a reflector.

In an embodiment, the image display unit 110 may generate light using any of various projection methods such as a cathode-ray tube (CRT) method, a liquid crystal display (LCT) method, or a digital light processing (DLP) method and may project the light to the image 500.

In an embodiment, the image display unit 110 may include any of various types of light sources. For example, the image display unit 110 may include at least one light source among a lamp, an LED, and a laser.

In an embodiment, the image display unit 110 may output an image at an aspect ratio of 4:3, an aspect ratio of 5:4, or a widescreen aspect ratio of 16:9 according to the purpose of the electronic device 100 or settings of the user 200, and may output the image 500 at any of various resolutions such as WVGA (854*480), SVGA (800*600), XGA (1024*768), WXGA (1180*720), WXGA (1180*800), SXGA (1180*1024), UXGA (1600*1100), Full HD (1920*1080), or UHD (3840*2160) according to the aspect ratio.

In an embodiment, instructions, data structures, and program code readable by the at least one processor 130 may be stored in the memory 120. In an embodiment, there may be one or more memories 120. In disclosed embodiments, operations performed by the at least one processor 130 may be performed by executing instructions or code of a program stored in the memory 120.

In an embodiment, the memory 120 may include at least one of a flash memory type, a hard disk type, a multimedia card micro type, a card-type memory (e.g., SD or XD memory), a random-access memory (RAM), a static random-access memory (SRAM), a read-only memory (ROM), an electrically erasable programmable read-only memory (EEPROM), a programmable read-only memory (PROM), a mask ROM, a flash ROM, a hard disk drive (HDD), or a solid-state drive (SSD). Instructions or program code for performing functions or operations of the electronic device 100 may be stored in the memory 120. Instructions, algorithms, data structures, program code, and application programs stored in the memory 120 may be implemented in a programming or scripting language such as C, C++, Java, or assembler.

In an embodiment, various types of modules that may be used to provide the image 500 to the user 200 through the image display unit 110 may be stored in the memory 120. A battery check module 121, an optical flow detection module 122, a flow map generation module 123, a coefficient calculation module 124, an image generation module 125, and an image adjustment module 126 may be stored in the memory 120. Each of the modules may include various executable program instructions operated using various circuitry, e.g., processing circuitry. However, not all of elements illustrated in FIG. 2 are essential elements. More or fewer elements than those illustrated in FIG. 2 may be stored in the memory 120. In an embodiment, a module for preprocessing the obtained input image 400 may be further stored in the memory 120.

In an embodiment, a 'module' included in the memory 120 may refer to a unit that processes a function or an operation performed by the at least one processor 130. A 'module' included in the memory 120 may be implemented as software such as instructions, algorithms, data structures, or program code.

In an embodiment, the battery check module 121 may include instructions or program code related to an operation or a function of checking a charge amount stored in the power supply unit 160. The battery check module 121 may include instructions or program code related to an operation or a function of comparing a magnitude of the checked charge amount with a magnitude of a preset charge amount. The battery check module 121 may include instructions or program code related to an operation or a function of generating a power control signal, when a magnitude of the checked charge amount is equal to or less than a magnitude of the preset charge amount.

In an embodiment, the preset charge amount may be a reference for the electronic device 100 to operate in a normal mode or a low-power mode. In an embodiment, a magnitude of the preset charge amount may be differently set according to the type and use of the electronic device 100. Also, a magnitude of the preset charge amount may be set by the user 200 using the electronic device 100.

In an embodiment, the optical flow detection module 122 may include instructions or program code related to an operation or a function of detecting the optical flow of the input image 400. The optical flow detection module 122 may include instructions or program code related to an operation or a function of detecting an optical flow based on a movement direction and a movement distance of an object included in a plurality of frame images included in the input image 400 during a plurality of frames. In an embodiment, the optical flow may be a vector component including information about a movement direction and a movement distance of the object during the plurality of frames.

In an embodiment, the memory 120 may further include a block division module including instructions or program code related to an operation or a function of dividing the input image 400 into a plurality of blocks. In an embodiment, the plurality of blocks may have an array of M*N, and in this case, M and N may each be a natural number. The block division module will be described below with reference to FIGS. 8B to 10.

In an embodiment, the optical flow detection module 122 may include instructions or program code related to an operation or a function of detecting the optical flow 410 of the input image 400 divided into the plurality of blocks through the block division module. The optical flow detection module 122 may include instructions or program code related to an operation or a function of detecting a plurality of sub-optical flows respectively corresponding to the plurality of blocks from the input image 400. The optical flow detection module 122 will be described below with reference to FIGS. 8A and 11.

In an embodiment, the flow map generation module 123 may include instructions or program code related to an operation or a function of generating a first flow map indicating a magnitude of the detected optical flow 410 and a second flow map indicating a direction of the detected optical flow 410. In an embodiment, the first flow map may include a magnitude coefficient indicating a magnitude of the optical flow 410. The second flow map may include a direction coefficient indicating a direction of the optical flow 410.

In an embodiment, the flow map generation module 123 may include instructions or program code related to an operation or a function of generating a final flow map based on the first flow map and the second flow map. The flow map generation module 123 may include instructions or program code related to an operation or a function of generating a final flow map using a weighted average of the first flow map and the second flow map calculated by multiplying the first flow map by a first weight and multiplying the second flow map by a second weight. In this case, magnitudes of the first weight and the second weight may be different from each other.

In an embodiment, the first flow map may include a plurality of first flow blocks respectively corresponding to the plurality of blocks. The second flow map may include a plurality of second flow blocks respectively corresponding to the plurality of blocks.

The flow map generation module 123, the first flow map, the second flow map, and the final flow map will be described below with reference to FIGS. 8A, 12, 13, and 14.

In an embodiment, the coefficient calculation module 124 may include instructions or program code related to an operation or a function of calculating a plurality of magnitude coefficients indicating magnitudes of a plurality of sub-optical flows respectively corresponding to the plurality of first flow blocks included in the first flow map. In an embodiment, the plurality of magnitude coefficients may be calculated as magnitudes of vector components of the plurality of sub-optical flows. In an embodiment, as a magnitude of a vector component of each of the plurality of sub-optical flows increases, a value of a magnitude coefficient may increase.

In an embodiment, the coefficient calculation module 124 may include instructions or program code related to an operation or a function of calculating a plurality of direction coefficients indicating directions of a plurality of sub-optical flows respectively corresponding to the plurality of second flow blocks included in the second flow map. In an embodiment, a direction coefficient included in each second flow block may be calculated as a difference between an average direction of vector components of sub-optical flows included in adjacent second flow blocks and a direction of a vector component of a sub-optical flow included in each second flow block. In an embodiment, as a difference between an average direction of vector components of sub-optical flows included in adjacent second flow blocks and a direction of a vector component of a sub-optical flow included in each second flow block increases, a value of a direction coefficient may increase.

In an embodiment, the coefficient calculation module 124 may include instructions or program code related to an operation or a function of calculating a plurality of final adjustment coefficients using a weighted average of the first flow map and the second flow map calculated by multiplying the plurality of magnitude coefficients included in the first flow map by a first weight and multiplying the plurality of direction coefficients included in the second flow map by a second weight. In an embodiment, the plurality of final adjustment coefficients may be coefficients respectively included in a plurality of final flow blocks included in the final flow map.

In an embodiment, the coefficient calculation module 124 may include instructions or program code related to an operation or a function of calculating a luminance coefficient based on the plurality of final adjustment coefficients included in the final flow map. The electronic device 100 may determine a degree of lowering a luminance of the image 500 displayed through the image display unit 110 according to the luminance coefficient. In an embodiment, the coefficient calculation unit 124 may calculate a luminance coefficient using an average value of the plurality of final adjustment coefficients. In an embodiment, the first weight and the second weight may be different from each other. A ratio between the first weight and the second weight may be a preset ratio.

In an embodiment, a flow map generation module 123 may include instructions or program code related to an operation or a function of generating the first flow map including the plurality of magnitude coefficients indicating magnitudes of the plurality of sub-optical flows in the plurality of first flow blocks.

In an embodiment, the flow map generation module 123 may include instructions or program code related to an operation or a function of generating the second flow map including the plurality of direction coefficients indicating directions of the plurality of sub-optical flows in the plurality of second flow blocks.

In an embodiment, the flow map generation module 123 may include instructions or program code related to an operation or a function of generating the final flow map including the plurality of final flow blocks respectively corresponding to the plurality of blocks and the plurality of final adjustment coefficients based on the plurality of magnitude coefficients and the plurality of direction coefficients in the plurality of final flow blocks, based on the first flow map and the second flow map.

Although the flow map generation module 123 and the coefficient calculation module 124 are illustrated as separate modules in FIG. 2, the present disclosure is not limited thereto, and the flow map generation module 123 and the coefficient calculation module 124 may be included as one module in the memory 120.

In an embodiment, an image generation module 125 may include instructions or program code related to an operation or a function of generating the image 500 to be provided through the image display unit 110 based on the input image 400. The image generation module 125 determine image information of the image 500 and may generate the image 500, based on the input image 400.

In an embodiment, an image adjustment module 126 may include instructions or program code related to an operation or a function of adjusting a luminance of the image 500 based on the input image 400.

In an embodiment, when the electronic device 100 operates in a low-power mode and detects an optical flow, the image adjustment module 126 may include instructions or program code related to an operation or a function of adjusting a luminance of the image 500 generated based on the input image 400 based on a magnitude and a direction of the optical flow. In an embodiment, when the electronic device 100 operates in a low-power mode and generates a final flow map, the image adjustment module 126 may include instructions or program code related to an operation or a function of adjusting a luminance of the image 500 generated based on the input image 400 according to the final flow map. In an embodiment, when the electronic device 100 operates in a low-power mode and a luminance coefficient is calculated using the final flow map, the image adjustment module 126 may include instructions or program code related to an operation or a function of adjusting a luminance of the image 500 generated based on the input image 400 according to the calculated luminance coefficient. In an embodiment, as a magnitude of the calculated luminance coefficient increases, a degree of lowering a magnitude of the luminance of the image 500 generated based on the input image 400 may increase.

In an embodiment, when the electronic device 100 operates in a low-power mode and a final flow map including a plurality of final flow blocks respectively including a plurality of final adjustment coefficients is generated, the image adjustment module 126 may include instructions or program code related to an operation or a function of adjusting a luminance of an area corresponding to each of the plurality of final flow blocks in the image 500 generated based on the input image 400 according to the plurality of final adjustment coefficients. In an embodiment, a luminance of the image 500 may be adjusted so that as a magnitude of a final adjustment coefficient included in a final flow block corresponding to the image 500 increases, a degree of lowering a luminance of an image of an area corresponding to the final flow block increases.

In an embodiment, when the electronic device 100 operates in a normal mode and a final flow map is not generated, the image adjustment module 126 may include instructions or program code related to an operation or a function of maintaining a luminance of the image 500 generated based on the input image 400.

In an embodiment, the image adjustment module 126 may include instructions or program code related to an operation or a function of adjusting at least one of a contrast ratio or a color of the image 500 generated based on the input image 400.

In an embodiment, when the electronic device 100 operates in a low-power mode and an optical flow is detected, the image adjustment module 126 may include instructions or program code related to an operation or a function of adjusting at least one of a contrast ratio or a color of the image 500 generated based on the input image 400 based on a magnitude and a direction of the optical flow. In an embodiment, when the electronic device 100 operates in a low-power mode and a final flow map is generated, the image adjustment module 126 may include instructions or program code related to an operation or a function of adjusting at least one of a contrast ratio or a color of the image 500 determined based on the input image 400 according to the final flow map.

In an embodiment, when the electronic device 100 operates in a low-power mode and a final flow map including a plurality of final flow blocks respectively including a plurality of final adjustment coefficients is generated, the image adjustment module 126 may include instructions or program code related to an operation or a function of adjusting at least one of a contrast ratio or a color of an area corresponding to each of the plurality of final flow blocks in the image 500 generated based on the input image 400 according to the plurality of final adjustment coefficients.

In an embodiment, as a magnitude of a final adjustment coefficient included in a final flow block corresponding to the image 500 increases, a contrast ratio of an image of an area corresponding to the final flow block may be adjusted to increase. In an embodiment, as a magnitude of a final adjustment coefficient included in a final flow block corresponding to the image 500 increases, a gray value corresponding to a color of an image of an area corresponding to the final flow block may be adjusted to increase.

In an embodiment, when the electronic device 100 operates in a normal mode and a final flow map is not generated, the image adjustment module 126 may include instructions or program code related to an operation or a function of maintaining a luminance of the image 500 generated based on the input image 400.

When the electronic device 100 operates in a normal mode and a final flow map is not generated, the image adjustment module 126 may include instructions or program code related to an operation or a function of maintaining a contrast ratio and a color of the image 500 generated based on the input image 400.

Although the image generation module 125 and the image adjustment module 126 are illustrated as separate modules in FIG. 2, the present disclosure is not limited thereto. In an embodiment, the image generation module 125 and the image adjustment module 126 may be configured as one module.

In an embodiment, the at least one processor 130 may include various processing circuitry, including at least one of, but not limited to, a central processing unit, a microprocessor, a graphics processing unit, an application processor (AP), an application-specific integrated circuit (ASIC), a digital signal processor (DSP), a digital signal processing device (DSPD), a programmable logic device (PLD), a field-programmable gate array (FPGA), a neural processing unit, or a dedicated artificial intelligence (AI) processor designed in a hardware structure specialized for training and processing an AI model. The processor 130 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the input/output interface 140 may include various input/output circuitry and perform an input/output operation of image data with an external server or another peripheral electronic device, under the control of the at least one processor 130. In an embodiment, the at least one processor 130 may receive the input image 400 from the external server or another peripheral electronic device through the input/output interface 140. In an embodiment, the input/output interface 140 may perform an input/output operation of image data with the external server or an external electronic device using at least one of input/output methods including high-definition multimedia Interface (HDMI), digital visual interface (DVI), and universal serial bus (USB). However, the present disclosure is not limited to the input/output method. Also, the input/output interface 140 may perform an input/output operation of voice data from the external server or external electronic device, under the control of the at least one processor 130.

In an embodiment, the user interface 150 may include various user interface circuitry and receive an input from the user 200 using the electronic device 100 under the control of the at least one processor 130. In an embodiment, the user 200 may provide an input that controls the electronic device 100 to operate in a low-power mode through the user interface 150.

In an embodiment, the power supply unit 160 may include a power supply and provide power to the electronic device 100 under the control of the at least one processor 130. In an embodiment, the power supply unit 160 may be connected to an external power supply device and may receive power from the external power supply device and transmit the power to the electronic device 100. In an embodiment, the power supply unit 160 may be charged by receiving power from the external power supply device and may transmit the charged power to the electronic device 100. In an embodiment, even when the power supply unit 160 is not connected to the external power supply device, the power supply unit 160 may transmit pre-charged power to the electronic device 100. In an embodiment, the power supply unit 160 may include a battery.

In an embodiment, the communication interface 170 may include various communication circuitry and perform data communication with the external server under the control of the at least one processor 130. The communication interface 170 may perform data communication not only with the external server but also with other peripheral electronic devices. The communication interface 170 may perform data communication with the server or other peripheral electronic devices using at least one of data communication methods including, for example, wired local area network (LAN), wireless LAN, Wi-Fi, Bluetooth, Zigbee, Wi-Fi Direct (WFD), infrared data association (IrDA), Bluetooth low energy (BLE), near-field communication (NFC), wireless broadband Internet (Wibro), world interoperability for microwave access (WiMAX), shared wireless access protocol (SWAP), wireless gigabit alliance (WiGig), and radio frequency (RF) communication. In an embodiment, the at least one processor 130 may receive the input image 400 from the external server or peripheral electronic devices through the communication interface 170.

In an embodiment, the light sensing unit 180 may include various circuitry including various sensing circuitry or a sensor and sense light outside the electronic device 100 under the control of the at least one processor 130. In an embodiment, the light sensing unit 180 may sense an illuminance of an environment of the electronic device 100. In an embodiment, the light sensing unit 180 may sense an intensity of light of an external lighting device 1810 by receiving light from the external lighting device 1810 described below. The at least one processor 130 may generate a control signal for adjusting a brightness of light provided by the external lighting device, according to the surrounding illuminance sensed through the light sensing unit 180.

Figure 3:
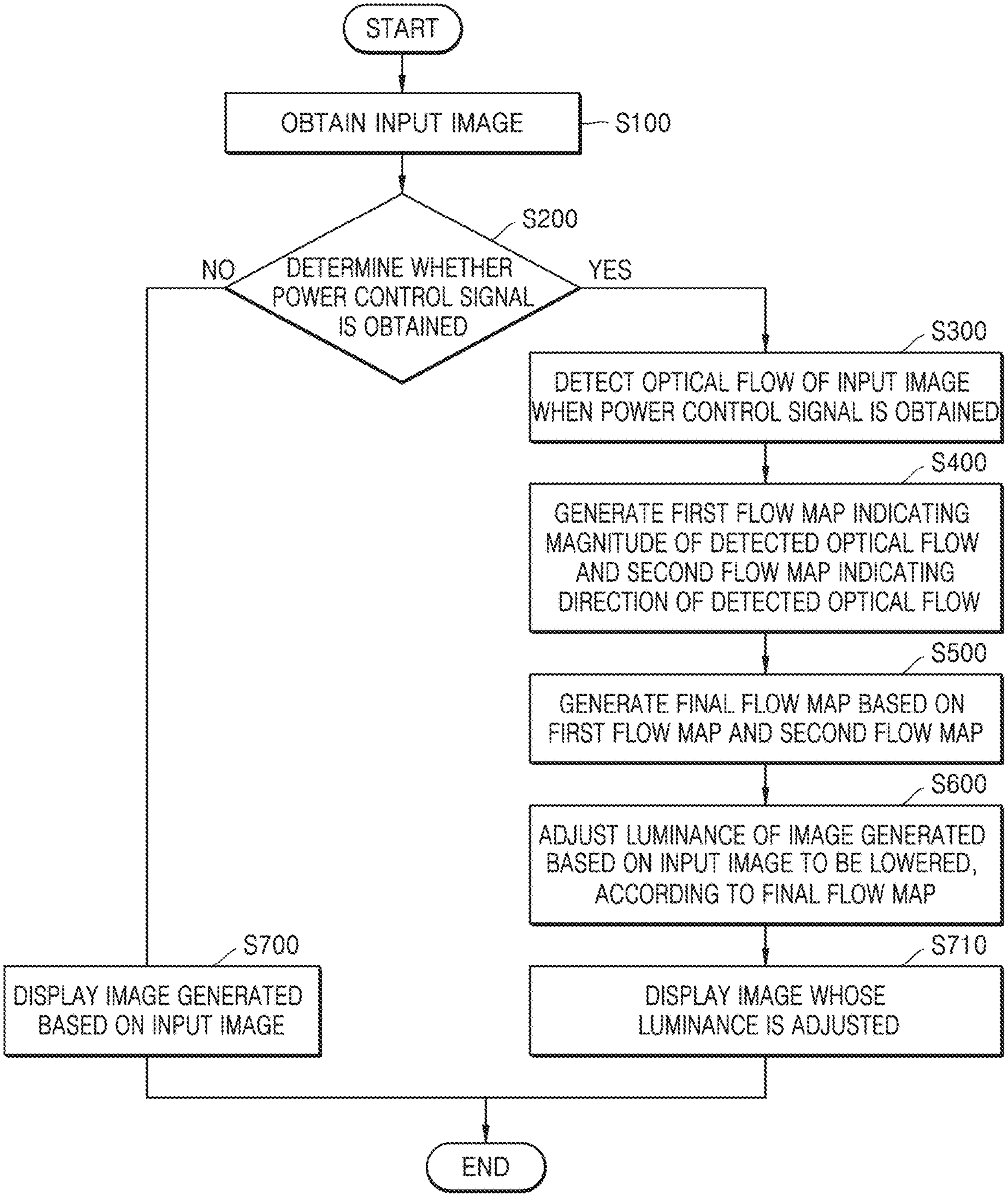
FIG. 3 is a flowchart illustrating an example operation of an electronic device, according to various embodiments.
Figure 4:
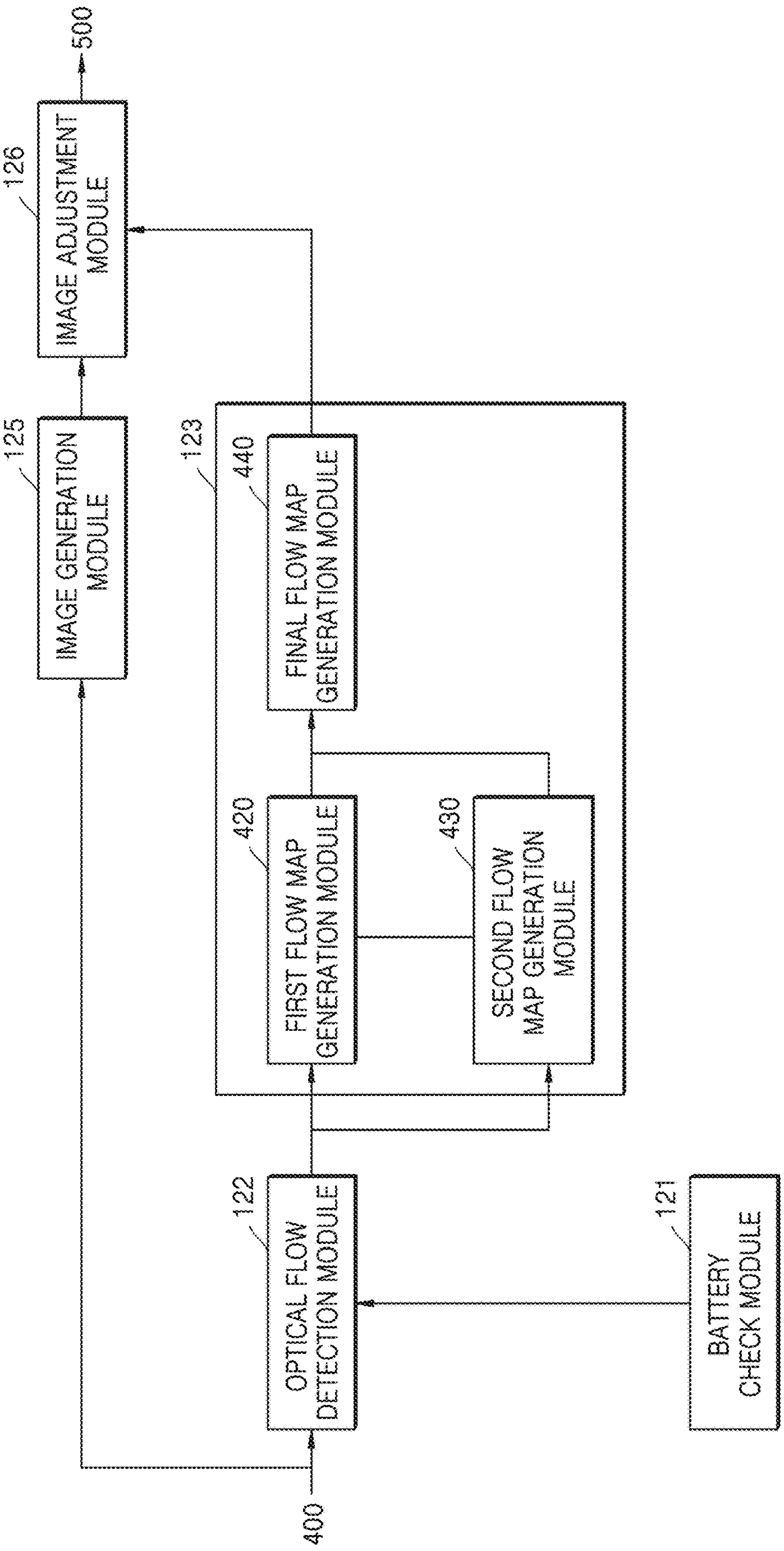
FIG. 4 is a diagram illustrating an example operation of displaying an image by lowering a luminance of the image according to a final flow map, according to various embodiments.
Figure 5:
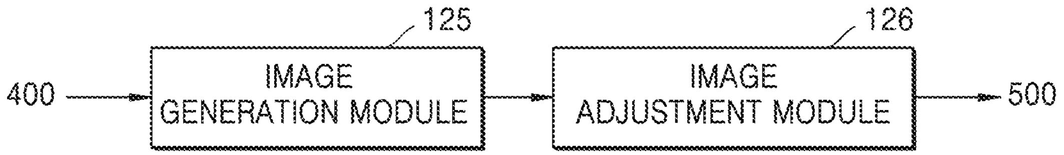
FIG. 5 is a diagram illustrating an example operation of an image display module, according to various embodiments.

FIG. 3 is a flowchart illustrating an example operation of an electronic device, according to various embodiments. FIG. 4 is a diagram illustrating an example operation of displaying an image by lowering a luminance of the image according to a final flow map, according to various embodiments. FIG. 5 is a diagram illustrating an example operation of an image display module, according to various embodiments.

Referring to FIGS. 1, 2, and 3, in an embodiment, a method of operating the electronic device 100 may include a step S100 of obtaining the input image 400. In an embodiment, in the step S100 of obtaining the input image 400, the at least one processor 130 may obtain the input image 400 through the input/output interface 140.

In an embodiment, although not shown in FIG. 3, the operating method of the electronic device 100 may include a step of generating the image 500 based on the input image 400. In an embodiment, in the step of generating the image 500 based on the input image 400, the at least one processor 130 may generate the image 500 to be displayed through the image display unit 110 based on the input image 400, by executing the image generation module 125.

In an embodiment, the operating method of the electronic device 100 may include a step S200 of determining whether a power control signal is obtained. In an embodiment, when the electronic device 100 obtains the power control signal, it may be determined that the power control signal is obtained in the step S200 of determining whether the power control signal is obtained. In an embodiment, the at least one processor 130 may obtain the power control signal, by executing the battery check module 121 stored in the memory. In an embodiment, the at least one processor 130 may generate the power control signal, by comparing a magnitude of a preset charge amount with a charge amount stored in the power supply unit 160, by executing the battery check module 121 stored in the memory.

In an embodiment, when it is determined in the step S200 of determining whether the power control signal is obtained that the power control signal is obtained, the electronic device 100 may operate in a low-power mode.

Referring to FIGS. 1, 3, and 4, in an embodiment, when the power control signal is obtained, the operating method of the electronic device 100 may include a step S300 of detecting the optical flow 410 of the input image 400. In an embodiment, in the step S300 of detecting the optical flow 410 of the input image 400, the at least one processor 130 may detect an optical flow of the input image 400 by executing the optical flow detection module 122.

In an embodiment, the operating method of the electronic device 100 may include a step S400 of generating a first flow map indicating a magnitude of the detected optical flow and a second flow map indicating a direction of the detected optical flow. In an embodiment, in the step S400 of generating the first flow map and the second flow map, the at least one processor 130 may generate the first flow map and the second flow map by executing the flow map generation module 123.

In an embodiment, the flow map generation module 123 may include a first flow map generation module 420 and a second flow map generation module 430. In an embodiment, the first flow map generation module 420 may include instructions or program code related to an operation or a function of generating the first flow map indicating a magnitude of the detected optical flow 410, based on the detected optical flow 410. In an embodiment, the second flow map generation module 430 may include instructions or program code related to an operation or a function of generating the second flow map indicating a direction of the detected optical flow 410, based on the detected optical flow 410.

In an embodiment, in the step S400 of generating the first flow map and the second flow map, the at least one processor 130 may generate the first flow map by executing the first flow map generation module 420. The at least one processor 130 may generate the second flow map by executing the second flow map generation module 430.

In an embodiment, the operating method of the electronic device 100 may include a step S500 of generating a final flow map based on the first flow map and the second flow map.

In an embodiment, the flow map generation module 123 may include a final flow map generation module 440 including instructions or program code related to an operation or a function of generating a final flow map based on the first flow map and the second flow map. In an embodiment, in the step S500 of generating the final flow map, the at least one processor 130 may generate the final flow map by executing the final flow map generation module 440.

In an embodiment, in the step S500 of generating the final flow map, the final flow map may be generated using a weighted average of the first flow map and the second flow map calculated by multiplying the first flow map by a first weight and multiplying the second flow map by a second weight.

In an embodiment, the operating method of the electronic device 100 may include a step S600 of adjusting a luminance of the image 500 generated based on the input image 400 to be lowered according to the final flow map. In an embodiment, in the step S600 of adjusting a luminance of the image 500 to be lowered, the at least one processor 130 may lower a luminance of the image 500 by executing the image adjustment module 126.

In an embodiment, the operating method of the electronic device 100 may include a step of S710 of displaying the image whose luminance is adjusted. In an embodiment, in the step S710 of displaying the image whose luminance is adjusted, the at least one processor 130 may control the image display unit 110 to display the image 500 whose luminance is adjusted. In an embodiment, in the step S710 of displaying the image whose luminance is adjusted, the at least one processor 130 may control the image display unit 110 to display the image 500 whose luminance is adjusted to be lowered.

In an embodiment, the at least one processor 130 may compare a magnitude of a preset charge amount with a magnitude of a charge amount stored in the power supply unit 160 by executing the battery check module 121 and may not generate a power control signal when the magnitude of the charge amount stored in the power supply unit 160 is greater than the magnitude of the preset charge amount.

In an embodiment, when the electronic device 100 does not obtain a power control signal, the operating method of the electronic device 100 may include a step S700 of displaying the image 500 generated based on the input image 400.

Referring to FIGS. 1, 3, and 5, in an embodiment, when it is determined in the step S200 of determining whether a power control signal is obtained that a power control signal is not obtained, the electronic device 100 may operate in a normal mode. In an embodiment, when the electronic device 100 operates in the normal mode, the electronic device 100 may display the image 500 whose luminance is not adjusted to be lowered through the image display unit 110.

In an embodiment, when the electronic device 100 operates in a normal mode and a final flow map is not generated, the at least one processor 130 may maintain a luminance of the image 500 generated through the image generation module 125, by executing the image adjustment module 126. The at least one processor 130 may display the image 500 whose luminance is maintained through the image display unit 110. However, the present disclosure is not limited thereto, and when the electronic device 100 operates in a normal mode and a final flow map is not generated, the at least one processor 130 may display the image 500 generated through the image generation module 125 through the image display unit 110, without executing the image adjustment module 126.

For convenience of explanation, the following will be described assuming that the electronic device 100 operates in a low-power mode.

Figure 6:
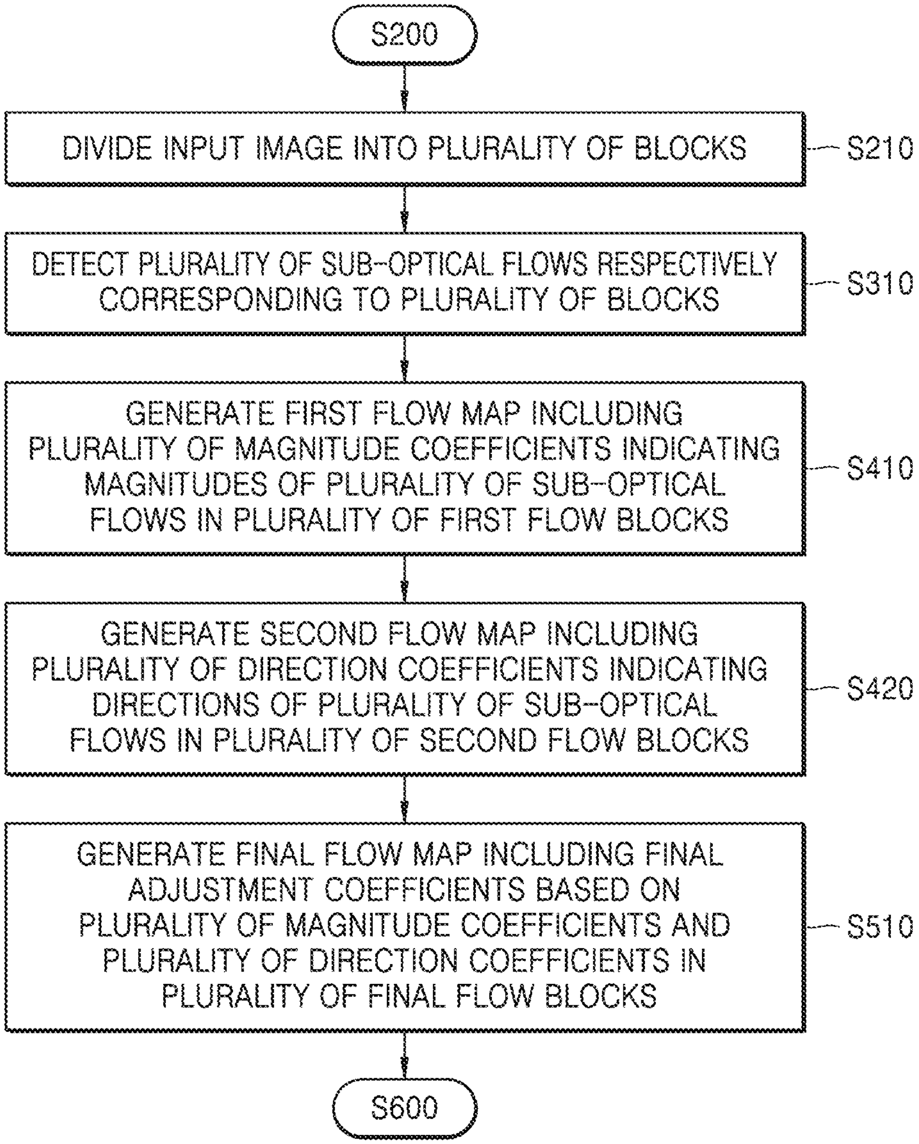
FIG. 6 is a flowchart illustrating an example operation of generating a final flow map including a plurality of final adjustment coefficients, according to various embodiments.

FIG. 6 is a flowchart illustrating an example operation of generating a final flow map including a plurality of final adjustment coefficients, according to various embodiments. Hereinafter, the same steps as those described with reference to FIG. 3 are denoted by the same reference numerals, and thus a repeated description thereof may not be provided here.

Referring to FIGS. 1, 2, 4, and 6, in an embodiment, an operating method of the electronic device 100 may include a step S210 of dividing the input image 400 into a plurality of blocks. In an embodiment, the at least one processor 130 may divide the input image 400 into a plurality of blocks, by executing a block division module. In an embodiment, the at least one processor 130 may divide the input image 400 into a plurality of blocks having an array of M*N, by executing the block division module. In this case, each of M and N may be a natural number. In an embodiment, each of M and N may be a preset arbitrary value.

In an embodiment, as M or N is set to a larger value, resolutions of a first flow map, a second flow map, and a final flow map described below may increase. Also, the accuracy of a magnitude and a direction of an optical flow of the input image 400 reflected in a luminance coefficient generated based on a plurality of final adjustment coefficients included in a final flow map may increase.

In an embodiment, as M or N is set to a smaller value, resolutions of the first flow map, the second flow map, and the final flow map described below may decrease. Accordingly, a workload and a working time of the at least one processor 130 for generating the first flow map, the second flow map, and the final flow map may be reduced. Also, a workload and a working time of the at least one processor 130 for calculating the luminance coefficient may be reduced. The plurality of blocks will be described in greater detail below with reference to FIGS. 8, 9 and 10.

In an embodiment, the operating method of the electronic device 100 may include a step S310 of detecting a plurality of sub-optical flows respectively corresponding to the plurality of blocks. In an embodiment, the at least one processor 130 may detect the optical flow 410 of the input image 400, by executing the optical flow detection module 122. In an embodiment, the optical flow 410 may include the plurality of sub-optical flows respectively corresponding to the plurality of blocks. The at least one processor 130 may detect the plurality of sub-optical flows of the input image 400 divided into the plurality of blocks, by executing the optical flow detection module 122. The plurality of sub-optical flows will be described in greater detail below with reference to FIGS. 8 and 11.

In an embodiment, the operating method of the electronic device 100 may include a step S410 of generating a first flow map including a plurality of first flow blocks respectively corresponding to the plurality of blocks and a plurality of magnitude coefficients indicating magnitudes of a plurality of sub-optical flows in the plurality of first flow blocks. In an embodiment, the at least one processor 130 may generate the first flow map including the plurality of first flow blocks and the plurality of magnitude coefficients indicating magnitudes of the plurality of sub-optical flows in the plurality of first flow blocks, by executing the first flow map generation module 420. The first flow map will be described below with reference to FIGS. 8 and 12.

In an embodiment, the operating method of the electronic device 100 may include a step S420 of generating a second flow map including a plurality of second flow blocks respectively corresponding to the plurality of blocks and a plurality of direction coefficients indicating directions of a plurality of sub-optical flows in the plurality of second flow blocks. In an embodiment, the at least one processor 130 may generate the second flow map including the plurality of second flow blocks and the plurality of direction coefficients indicating directions of the plurality of sub-optical flows in the plurality of second flow blocks, by executing the second flow map generation module 430. The second flow map will be described below with reference to FIGS. 8 and 13.

In an embodiment, the operating method of the electronic device 100 may include a step S510 of generating a final flow map including a plurality of final flow blocks respectively corresponding to the plurality of blocks and a plurality of final adjustment coefficients based on the plurality of magnitude coefficients and the plurality of direction coefficients in the plurality of final flow blocks. In an embodiment, the at least one processor 130 may generate the final flow map including the plurality of final flow blocks and the plurality of final adjustment coefficients in the plurality of final flow blocks, by executing the final flow map generation module 440. The final flow map will be described in greater detail below with reference to FIGS. 8 and 14.

Figure 7:
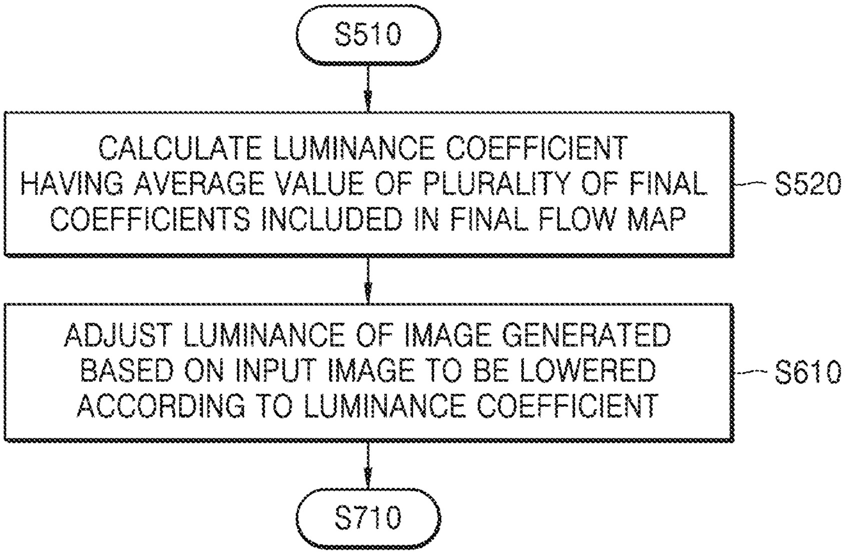
FIG. 7 is a flowchart illustrating an example operation of displaying an image by lowering a luminance of the image according to a luminance coefficient, according to various embodiments.

FIG. 7 is a flowchart illustrating an example operation of displaying an image by lowering a luminance of the image according to a luminance coefficient, according to various embodiments. Hereinafter, the same steps as those described with reference to FIG. 6 are denoted by the same reference numerals, and thus a repeated description thereof may not be provided.

Referring to FIGS. 2, 6, and 7, in an embodiment, an operating method of the electronic device 100 may include a step of S520 of calculating a luminance coefficient having an average value of a plurality of final adjustment coefficients included in a final flow map. In an embodiment, the at least one processor 130 may calculate a luminance coefficient using an average value of the plurality of final adjustment coefficients included in the final flow map, by executing the coefficient calculation module 124. However, the present disclosure is not limited thereto. In an embodiment, the coefficient calculation module 124 may include instructions or program code related to an operation or a function of calculating a luminance coefficient by calculating a maximum value or a minimum value of the plurality of final adjustment coefficients. In an embodiment, the at least one processor 130 may calculate a luminance coefficient using a maximum value or a minimum value of the plurality of final adjustment coefficients included in the final flow map, by executing the coefficient calculation module 124.

In an embodiment, the operating method of the electronic device 100 may include a step S610 of adjusting a luminance of the image 500 generated based on the input image 400 according to the luminance coefficient to be lowered. In an embodiment, the at least one processor 130 may adjust the image 500 by lowering a luminance of the image 500 generated through the image generation module 125 according to the luminance coefficient, by executing the image adjustment module 126. The at least one processor 130 may control the image display unit 110 to display the image 500 whose luminance is adjusted to be lowered through the image adjustment module 126.

Figure 8:
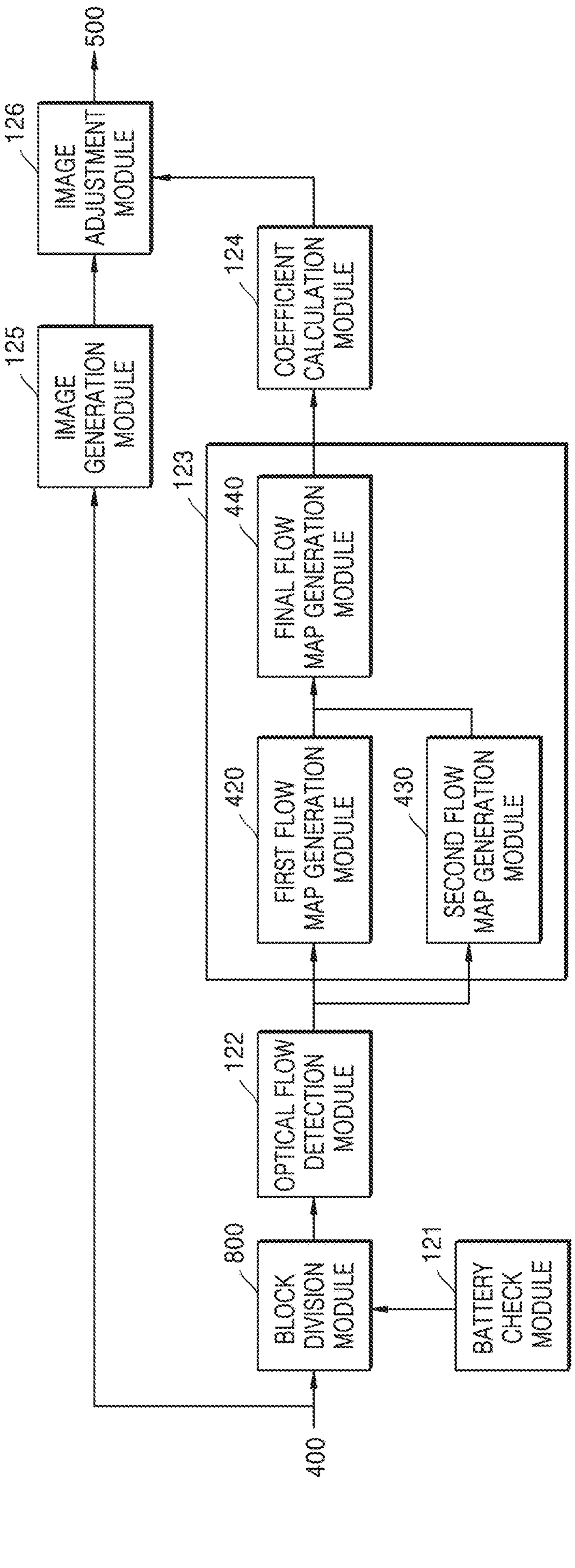
FIG. 8 is a diagram illustrating an example operation of displaying an image by lowering a luminance of the image according to a luminance coefficient calculated based on an input image divided into a plurality of blocks, according to various embodiments
Figure 9:
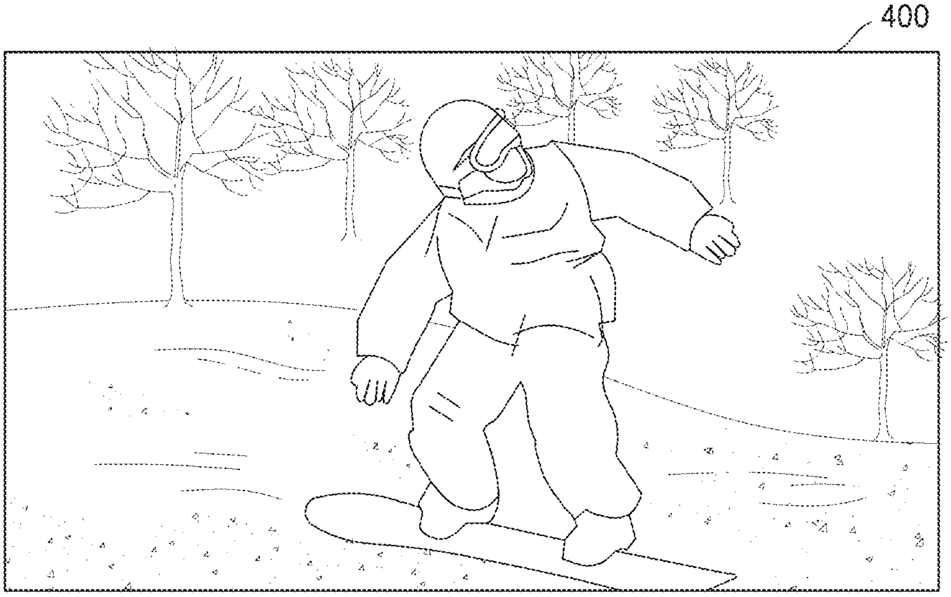
FIG. 9 is a diagram illustrating an example input image, according to various embodiments.
Figure 10:
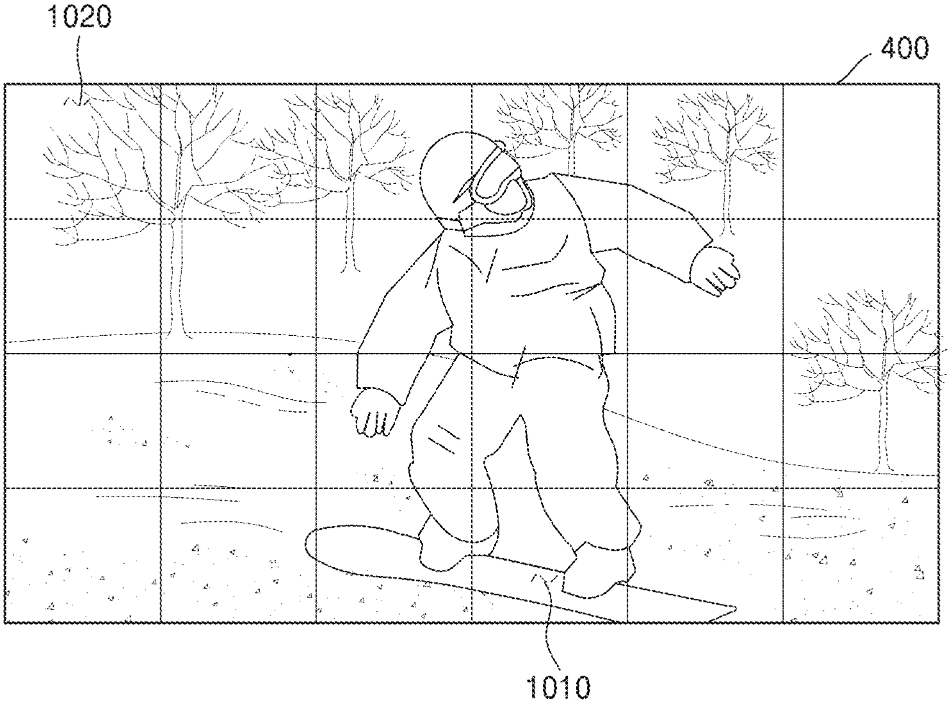
FIG. 10 is a diagram illustrating an example input image divided into a plurality of blocks, according to various embodiments.
Figure 11:
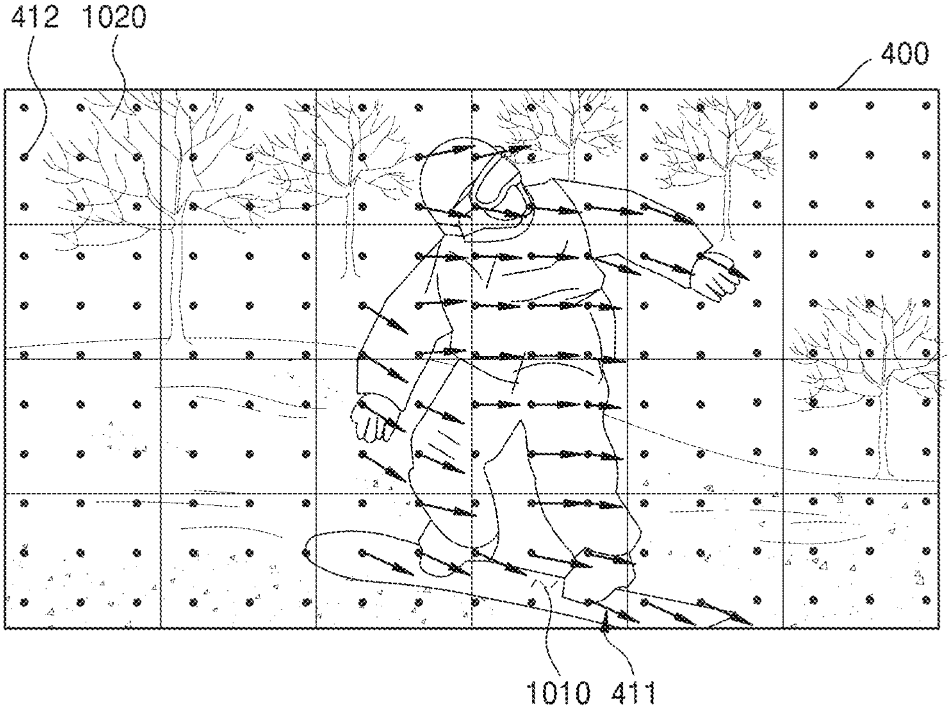
FIG. 11 is a diagram illustrating an example detected optical flow of an input image, according to various embodiments.

FIG. 8 is a diagram illustrating an example operation of displaying an image by lowering a luminance of the image according to a luminance coefficient calculated based on an input image divided into a plurality of blocks, according to various embodiments. FIG. 9 is a diagram illustrating an example input image, according to various embodiments. FIG. 10 is a diagram illustrating an input image divided into a plurality of blocks, according to various embodiments. FIG. 11 is a diagram illustrating a detected optical flow of an input image, according to various embodiments. FIG. 12 is a diagram illustrating a first flow map, according to various embodiments. FIG. 13 is a diagram illustrating a second flow map, according to various embodiments. FIG. 14 is a diagram illustrating a final flow map, according to various embodiments. Hereinafter, the same elements as those described with reference to FIG. 4 are denoted by the same reference numerals, and thus a repeated description thereof may not be provided here.

Referring to FIGS. 2, 8, and 9, in an embodiment, the at least one processor 130 may obtain the input image 400. In an embodiment, the input image 400 may be an image obtained by photographing a background and a moving object. In an embodiment, an object included in the input image 400 may include the background and the moving object. In an embodiment, the at least one processor 130 may obtain the input image 400 through the input/output interface 140. However, the present disclosure is not limited thereto, and when the electronic device 100 includes an photographing device such as a camera, the electronic device 100 may obtain the input image 400 by directly photographing the background and the moving object.

In an embodiment, the input image 400 of FIG. 9 is an image obtained by photographing the background that does not move over time and one moving object that moves over time. However, the present disclosure is not limited thereto, and the input image 400 may include two or more moving objects that move over time, and in this case, movement directions and movement speeds of the two or more moving objects may be different from each other. In an embodiment, the input image 400 may be an image obtained by photographing only the background that does not move over time. For convenience of explanation, the following will be described assuming that one moving image that moves over time and the background that does not move over time are included in the input image 400.

Referring to FIGS. 2, 8, and 10, in an embodiment, the at least one processor 130 may divide the input image 400 into a plurality of blocks (e.g., 1010 and 1020) by executing a block division module 800. In an embodiment, the at least one processor 130 may divide the input image 400 into the plurality of blocks (e.g., 1010 and 1020) in a preset array of M*N. The plurality of blocks (e.g., 1010 and 1020) may include a first block 1010 including the moving object that moves over time and a second block 1020 including the background that does not move over time. Although M is 6 and N is 4 in FIG. 10, the present disclosure is not limited thereto.

Referring to FIGS. 2 and 8, in an embodiment, the at least one processor 130 may obtain a power control signal generated by comparing a magnitude of a preset charge amount with a magnitude of a charge amount stored in the power supply unit 160 by executing the battery check module 121. In an embodiment, the at least one processor 130 may divide the input image 400 into the plurality of blocks (e.g., 1010 and 1020) by executing the block division module 800 when the power control signal is obtained. However, the present disclosure is not limited thereto, and the at least one processor 130 may not adjust at least one of a luminance, a contrast ratio, or a color of an image when a power control signal is not obtained in a process of generating a final flow map and calculating a final adjustment coefficient and a luminance coefficient.

Referring to FIGS. 2, 8, and 11, in an embodiment, the at least one processor 130 may detect optical flows 411 and 412 of the input image 400 by executing the optical flow detection module 122. In an embodiment, the input image 400 may include a plurality of frame images respectively corresponding to a plurality of frames. The at least one processor 130 may detect identify positions of the moving object and the background included in the input image 400 during the plurality of frames, and may detect an optical flow including information about a movement direction and a movement distance of the moving object and the background. In an embodiment, the at least one processor 130 may identify positions of the moving object and the background included in the input image 400 during two adjacent frames, and may detect an optical flow including information about a movement direction and a movement distance of the moving object and the background. In an embodiment, the optical flow may be a vector including a magnitude component and a direction component. For convenience of explanation, the following will be described assuming that the optical flow has a magnitude and a direction.

In an embodiment, the optical flows 411 and 412 may include a plurality of sub-optical flows 411 and 412 respectively corresponding to the plurality of blocks (e.g., 1010 and 1020). The at least one processor 130 may detect the plurality of sub-optical flows 411 and 412 respectively corresponding to the plurality of blocks (e.g., 1010 and 1020). In an embodiment, the plurality of sub-optical flows may include the optical flow 411 of the moving object included in the input image 400 and the optical flow 412 of the background included in the input image 400. In an embodiment, the optical flow 411 of the moving object may correspond to the first block 1010, and the optical flow 412 of the background may correspond to the second block 1020.

In an embodiment, a magnitude and a direction of the optical flow 411 of the moving object included in the input image 400 may be different from a magnitude and a direction of the optical flow 412 of the background included in the input image 400. In an embodiment, a magnitude of the optical flow 411 of the moving object may be greater than a magnitude of the optical flow 412 of the background. In an embodiment, the background does not move over time, and thus, the optical flow 412 of the background may not include a direction component. In an embodiment, the moving object moves over time, and thus, the optical flow 411 of the moving object may include a direction component in a direction in which the moving object moves.

Referring to FIGS. 2, 8, 11, and 12, in an embodiment, the at least one processor 130 may generate a first flow map 1200 indicating magnitudes of the detected optical flows 411 and 412, by executing the first flow map generation module 420. In an embodiment, the at least one processor 130 may generate the first flow map 1200 indicating magnitudes of the plurality of sub-optical flows 411 and 412. In an embodiment, the first flow map 1200 may include a plurality of first flow blocks respectively corresponding to a plurality of blocks, and indicate magnitudes of the plurality of sub-optical flows 411 and 412 in the plurality of first flow blocks.

In an embodiment, the first flow map 1200 may include magnitude coefficients calculated based on magnitudes of a plurality of sub-optical flows included in each first flow block, in each of the first flow blocks. In an embodiment, a magnitude coefficient included in each first flow block may be an average value of magnitudes of a plurality of sub-optical flows included in the first flow block.

In an embodiment, the at least one processor 130 may generate a first flow map including a plurality of first flow blocks and a plurality of magnitude coefficients indicating magnitudes of a plurality of sub-optical flows in each of the plurality of first flow blocks.

Referring to FIG. 12, a magnitude of a magnitude coefficient included in a first flow block corresponding to the first block 1010 from among the plurality of first flow blocks may be greater than a magnitude of a magnitude coefficient included in a first flow block corresponding to the second block 1020 from among the plurality of first flow blocks. Also, as a movement speed of the moving object included in the input image 400 increases, a magnitude of a magnitude coefficient corresponding to the moving object may increase.

Referring to FIGS. 2, 8, 11, and 13, in an embodiment, the at least one processor 130 may generate a second flow map 1300 indicating directions of the detected optical flows 411 and 412, by executing the second flow map generation module 430. In an embodiment, the at least one processor 130 may generate the second flow map 1300 indicating directions of the plurality of sub-optical flows 411 and 412. In an embodiment, the second flow map 1300 may include a plurality of second flow blocks respectively corresponding to a plurality of blocks and indicate directions of the plurality of sub-optical flows 411 and 412 in the plurality of second flow blocks.

In an embodiment, the second flow map 1300 may include direction coefficients calculated based on directions of a plurality of sub-optical flows included in each second flow block, in each of the plurality of second flow blocks. In an embodiment, a direction coefficient included in each second flow block may be calculated according to a difference between an average direction of a plurality of sub-optical flows included in each second flow block and an average direction of a plurality of sub-optical flows included in second flow blocks adjacent to the second flow block. In an embodiment, as a difference between the average direction of the plurality of sub-optical flows included in the second flow blocks and the average direction of the plurality of sub-optical flows included in each second flow block increases, a value of a direction coefficient included in each second flow block direction may increase.

However, the present disclosure is not limited thereto, and in an embodiment, a direction coefficient included in each second flow block may be calculated according to a difference between an average direction of a plurality of sub-optical flows included in each second flow block and an average direction of a plurality of sub-optical flows included in all of the plurality of second flow blocks included in the second flow map 1300.

Referring to FIG. 13, a magnitude of a direction coefficient included in a second flow block corresponding to the first block 1010 from among the plurality of second flow blocks may be greater than a magnitude of a direction coefficient included in a second flow block corresponding to the second block 1020 from among the plurality of second flow blocks. Also, as a difference between a movement direction of the moving object and a movement direction of the background included in the input image 400 increases, a magnitude of a direction coefficient corresponding to the moving object may increase.

Referring to FIGS. 2, 8, 11, and 14, in an embodiment, the at least one processor 130 may generate a final flow map 1400 based on the first flow map 1200 and the second flow map 1300, by executing the final flow map generation module 440. In an embodiment, the at least one processor 130 may generate the final flow map 1400 based on a plurality of magnitude coefficients included in the first flow map 1200 and a plurality of direction coefficients included in the second flow map 1300. The final flow map 1400 may include a plurality of final flow blocks respectively corresponding to the plurality of blocks and a plurality of final adjustment coefficients respectively corresponding to the plurality of final flow blocks.

In an embodiment, the at least one processor 130 may calculate the plurality of final adjustment coefficients using a weighted average of a value obtained by multiplying the plurality of magnitude coefficients included in the first flow map 120 by a first weight and a value obtained by multiplying the plurality of direction coefficients included in the second flow map 1300 by a second weight.

In an embodiment, a magnitude of the first weight and a magnitude of the second weight may be different from each other. In an embodiment, as a magnitude of the first weight is greater than a magnitude of the second weight, the importance of the plurality of magnitude coefficients on the plurality of final adjustment coefficients may increase. Accordingly, the influence of a movement speed of the moving object included in the input image 400 on the plurality of final adjustment coefficients may greatly increase. In an embodiment, as a magnitude of the second weight is greater than a magnitude of the first weight, an importance of the plurality of direction coefficients on the plurality of final adjustment coefficients may increase. Accordingly, the influence of a difference in a movement direction of the moving object, compared to the background included in the input image 400, on the plurality of final adjustment coefficients may increase.

In FIG. 14, the final flow map 1400 calculated using a weighted average after multiplying the first flow map 1200 of FIG. 12 by a first weight and multiplying the second flow map 1300 of FIG. 13 by a second weight is illustrated. In this case, a magnitude of the second weight was calculated to be three times a magnitude of the first weight. However, the present disclosure is not limited thereto. In an embodiment, the final flow map may be calculated by making a magnitude of the first weight greater than a magnitude of the second weight. Also, the final flow map may be calculated by making a magnitude of the first weight equal to a magnitude of the second weight.

Referring to FIGS. 2, 8, and 14, in an embodiment, the at least one processor 130 may calculate a luminance coefficient based on the final flow map 1400, by executing the coefficient calculation module 124. In an embodiment, the at least one processor 130 may obtain a luminance coefficient by calculating an average value of the plurality of final adjustment coefficients included in the final flow map 1400.

Referring to FIGS. 1, 2, and 8, the at least one processor 130 may adjust a luminance of the image 500 generated through the image generation module 125 based on the luminance coefficient, by executing the image adjustment module 126. In an embodiment, the at least one processor 130 may adjust a luminance of the image 500 to be lowered according to the luminance coefficient. In an embodiment, as a magnitude of the luminance coefficient increases, an amount by which the at least one processor 130 adjusts a luminance of the image 500 to be lowered may increase.

Accordingly, as a movement speed of the moving object included in the input image 500 increases or a difference between a movement direction of the moving object and a movement direction of the background increases, an amount by which the at least one processor 130 adjusts a luminance of the image 500 to be lowered may increase. Also, the influence of a movement speed of the moving object or a movement direction of the moving object included in the input image 500 on adjusting a luminance of the image 500 to be lowered may be varied, by making a magnitude of the first weight different from a magnitude of the second weight.

Figure 15A:
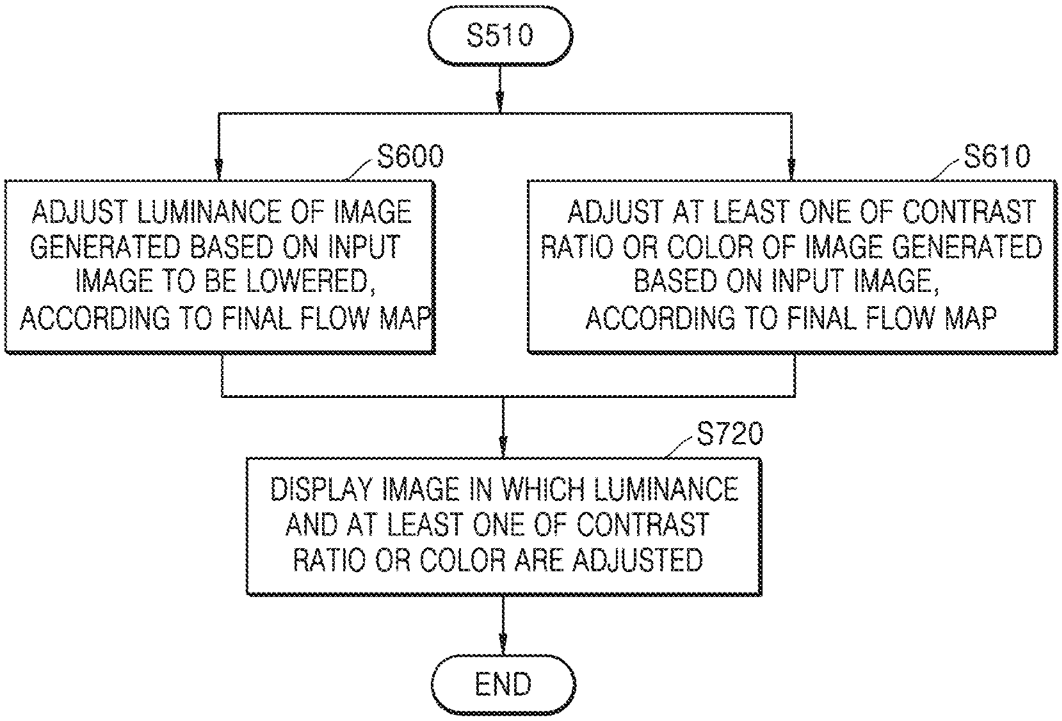
FIG. 15A is a flowchart illustrating an example operation of displaying an image by adjusting at least one of a contrast ratio or a color of the image according to a final flow map, according to various embodiments.

FIG. 15A is a flowchart illustrating an example operation of displaying an image by adjusting at least one of a contrast ratio or a color of the image according to a final flow map, according to various embodiments. Hereinafter, the same steps as those described with reference to FIGS. 3 and 6 are denoted by the same reference numerals, and thus a repeated description thereof may not be provided here.

Referring to FIGS. 2, 3, 6, 14, and 15A, in an embodiment, an operating method of the electronic device 100 may include a step of S600 of adjusting a luminance of the image 500 generated based on the input image to be lowered, according to the final flow map 1400, after the step S510 of generating the final flow map 1400.

In an embodiment, the operating method of the electronic device 100 may include a step of S610 of adjusting at least one of a contrast ratio or a color of the image 500 generated based on the input image, according to the final flow map 1400, after the step S510 of generating the final flow map 1400. In an embodiment, the at least one processor 130 may adjust at least one of a contrast ratio or a color of the image 500 by executing the image adjustment module 126.

In an embodiment, the at least one processor 130 may adjust at least one of a contrast ratio or a color of the image 500 corresponding to each of a plurality of final flow blocks included in the final flow map 1400. In an embodiment, the at least one processor 130 may adjust at least one of a contrast ratio or a color of the image 500, based on a final adjustment coefficient included in each of the plurality of final flow blocks.

In an embodiment, the at least one processor 130 may adjust the image 500 so that a contrast ratio of the image 500 increases as a magnitude of the final adjustment coefficient increases. Accordingly, a magnitude of an amount by which a contrast ratio of the image 500 is adjusted to be increased and a magnitude of an amount by which a luminance of the image 500 is adjusted to be lowered may be proportional.

In an embodiment, the at least one processor 130 may adjust the image 500 so that as a gray value corresponding to a color of the image 500 increases as a magnitude of the final adjustment coefficient increases. Accordingly, a magnitude of an amount by which a gray value of the image 500 is adjusted to be increased and a magnitude of an amount by which a luminance of the image 500 is adjusted to be lowered may be proportional.

In an embodiment, the operating method of the electronic device 100 may include a step S720 of displaying the image in which at least one of a contrast ratio or a color and a luminance are adjusted, after the step S600 of adjusting a luminance of the image 500 to be lowered and the step S610 of adjusting at least one of a contrast ratio or a color of the image 500.

In an embodiment, in the step S720 of displaying the image in which at least one of a contrast ratio or a color and a luminance are adjusted, the at least one processor 130 may control the image display unit 110 to display the image in which at least one of a contrast ratio or a color and a luminance are adjusted.

Figure 15B:
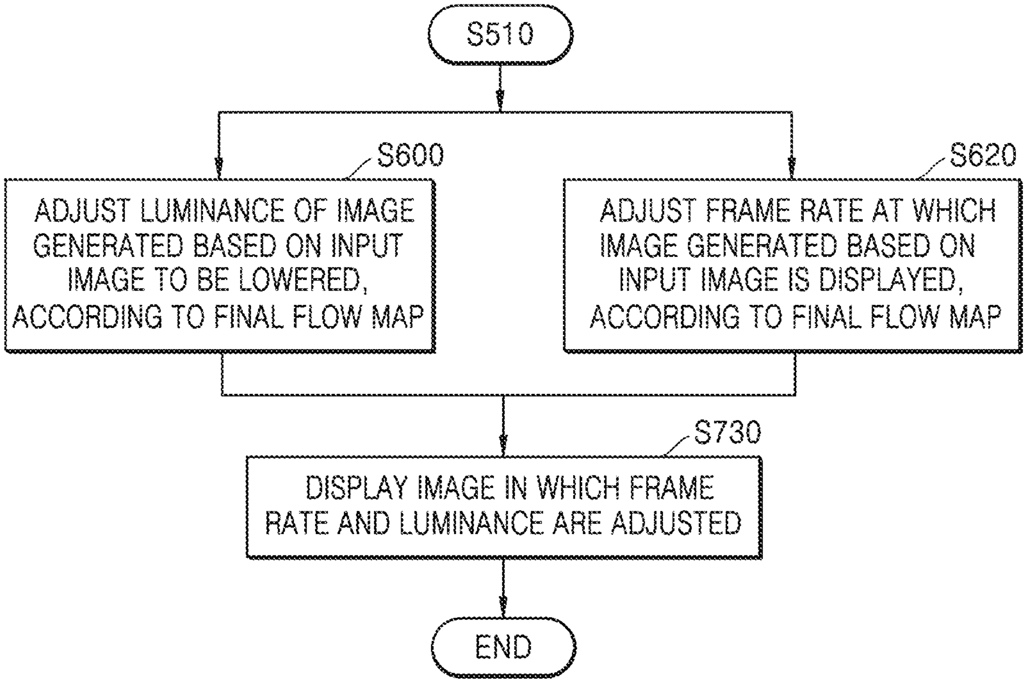
FIG. 15B is a flowchart illustrating an example operation of adjusting a frame rate at which an image is displayed according to a final flow map, according to various embodiments.

FIG. 15B is a flowchart illustrating an example operation of adjusting a frame rate at which an image is displayed according to a final flow map, according to various embodiments. Hereinafter, the same steps as those described with reference to FIGS. 3, 6, and 15A are denoted by the same reference numerals, and thus a repeated description thereof may not be provided here.

Referring to FIGS. 2, 3, 6, 14, and 15B, in an embodiment, the operating method of the electronic device 100 may include the step S600 of adjusting a luminance of the image 500 generated based on the input image to be lowered, according to the final flow map 1400, after the step S510 of generating the final flow map 1400.

In an embodiment, the operating method of the electronic device 100 may include a step S620 of adjusting a frame rate at which the image 500 generated based on the input image is displayed, according to the final flow map 1400, after the step S510 of generating the final flow map 1400. In an embodiment, the at least one processor 130 may adjust a frame rate at which the image 500 is displayed by executing the image adjustment module 126.

In an embodiment, the at least one processor 130 may adjust a frame rate at which the image 500 corresponding to each of a plurality of final flow blocks included in the final flow map 1400 is displayed. In an embodiment, the at least one processor 130 may adjust a frame rate at which the image 500 is displayed, based on a final adjustment coefficient included in each of the plurality of final flow blocks.

In an embodiment, the at least one processor 130 may adjust the image 500 so that a frame rate at which the image 500 is displayed increases as a magnitude of the final adjustment coefficient increases. Accordingly, a magnitude of an amount by which a frame rate at which the image 500 is displayed is adjusted to be increased and a magnitude of an amount by which a luminance of the image 500 is adjusted to be lowered may be proportional.

In an embodiment, the operating method of the electronic device 100 may include a step S730 of displaying the image in which a frame rate and a luminance are adjusted, after the step S600 of adjusting a luminance of the image 500 to be lowered and the step S620 of adjusting a frame rate at which the image 500 is displayed.

In an embodiment, in the step S730 of displaying the image in which a frame rate and a luminance are adjusted, the at least one processor 130 may control the image display unit 110 to display the image in which a frame rate and a luminance are adjusted.

Figure 16:
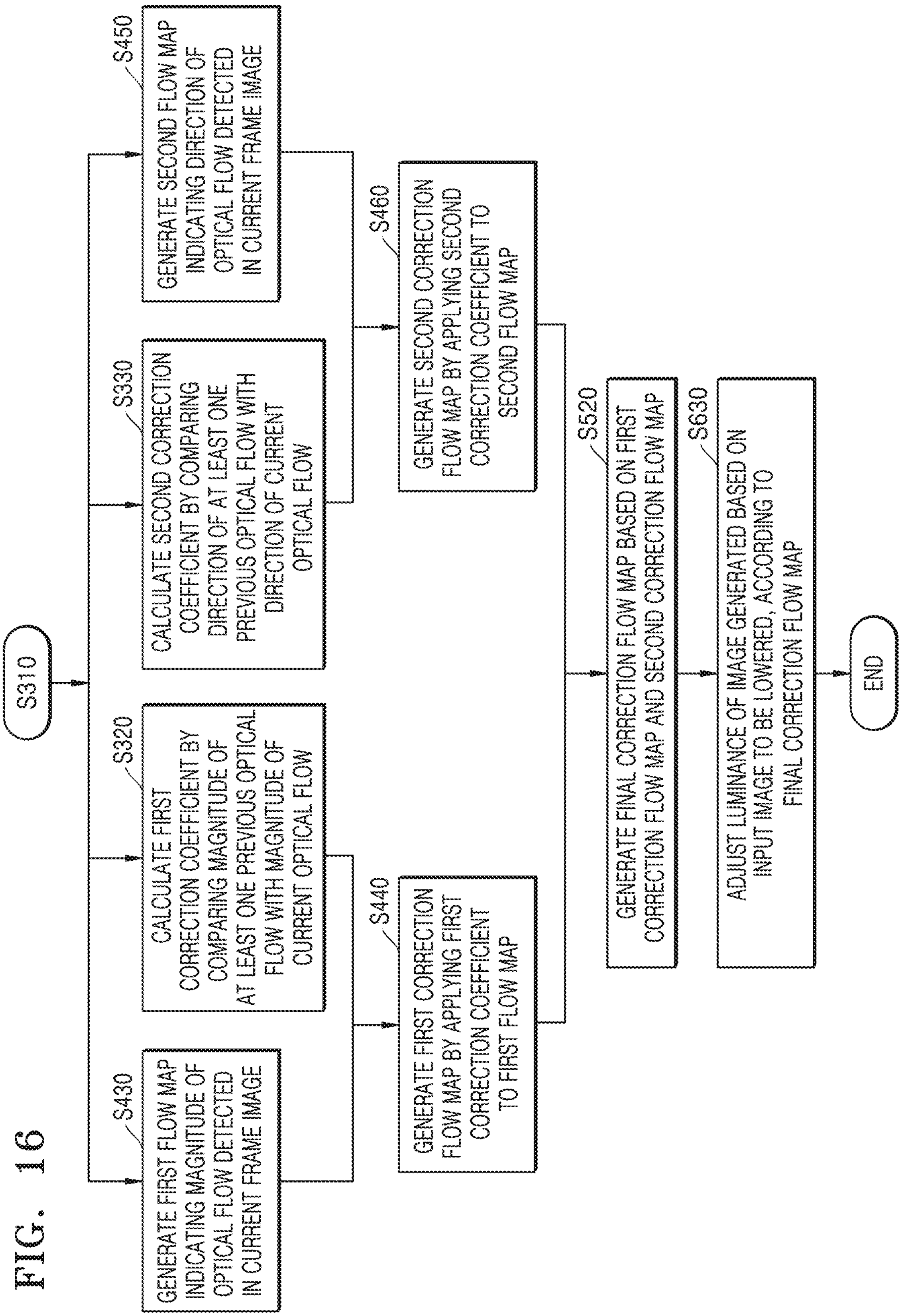
FIG. 16 is a flowchart illustrating an example operation of generating a final adjustment flow map based on a plurality of frame images, according to various embodiments.
Figure 17:
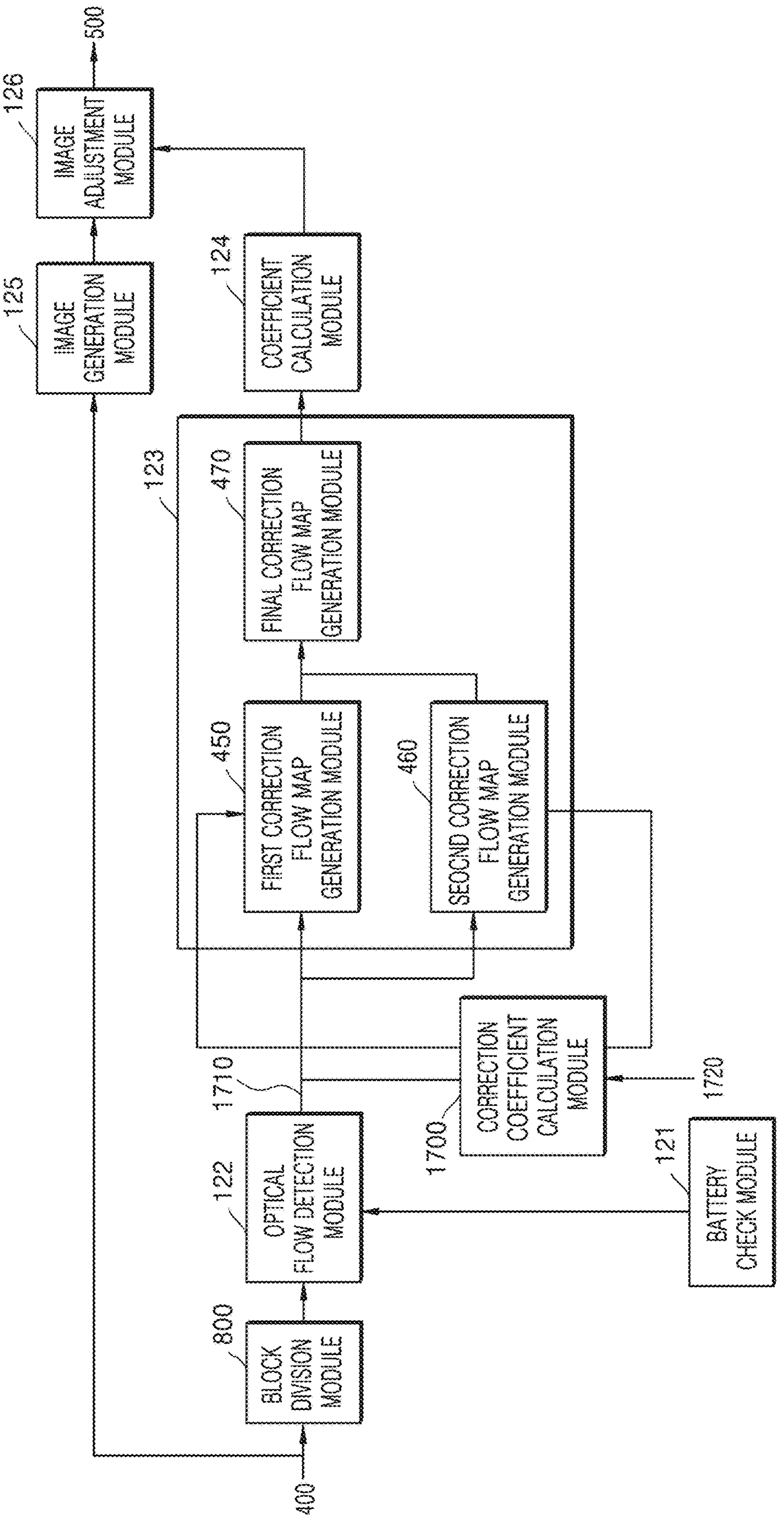
FIG. 17 is a diagram illustrating an example operation of generating a final adjustment flow map based on a plurality of frame images, according to various embodiments.

FIG. 16 is a flowchart illustrating an example operation of generating a final adjustment flow map based on a plurality of frame images, according to various embodiments. FIG. 17 is a diagram illustrating an example operation of generating a final adjustment flow map based on a plurality of frame images, according to various embodiments. The same elements and steps as those described with reference to FIGS. 3, 6, and 8 are denoted by the same reference numerals, and thus a repeated description thereof may not be provided here.

Referring to FIGS. 1, 2, 16, and 17, in an embodiment, the input image 400 may include a plurality of frame images respectively corresponding to a plurality of frames. In an embodiment, a moving object included in the input image 400 may move across the plurality of frames.

In an embodiment, the at least one processor 130 may obtain the input image, and then may divide the input image 400 into a plurality of blocks by executing the block division module 800.

In an embodiment, when the at least one processor 130 obtains a power control signal by executing the battery check module 121, the at least one processor 130 may detect an optical flow 1710 of the input image 400 by executing the optical flow detection module 122. In this case, the detected optical flow 1710 may be a first optical flow 1710 detected based on a current frame image. In an embodiment, the first optical flow 1710 may be detected by comparing a frame image corresponding to a current frame with a frame image corresponding to an immediately preceding image.

In an embodiment, after the step S310 of detecting the optical flow 1710 of the input image 400, an operating method of the electronic device 100 may include a step S320 of calculating a first correction coefficient by comparing a magnitude of the first optical flow 1710 with a magnitude of at least one second optical flow 1720 detected based on at least one previous frame image. The second optical flow 1720 may be an optical flow detected by comparing the frame image corresponding to the immediately preceding frame with a frame image corresponding to a previous frame. However, the present disclosure is not limited thereto, and the second optical flow 1720 may be an optical flow calculated using an average of accumulated optical flows from a first frame to an immediately preceding frame from among a plurality of frames of the input image 500.

In an embodiment, the at least one processor 130 may calculate a first correction coefficient by comparing a magnitude of the first optical flow 1710 with a magnitude of the second optical flow 1720, by executing a correction coefficient calculation module 1700. In an embodiment, a magnitude of the first correction coefficient may be proportional to a difference between a magnitude of the first optical flow 1710 and a magnitude of the second optical flow 1720.

In an embodiment, after the step S310 of detecting the optical flow 1710 of the input image 400, the operating method of the electronic device 100 may include a step S330 of calculating a second correction coefficient by comparing a direction of the first optical flow 1710 with a direction of at least one second optical flow 1720 detected based on at least one previous frame image.

In an embodiment, the at least one processor 130 may calculate a second correction coefficient by comparing a direction of the first optical flow 1710 with a direction of the second optical flow 1720, by executing the correction coefficient calculation module 1700. In an embodiment, a magnitude of the second correction coefficient may be proportional to a difference between a direction of the first optical flow 1710 and a direction of the second optical flow 1720.

In an embodiment, the operating method of the electronic device 100 may include a step S430 of generating a first flow map indicating a magnitude of the first optical flow 1710 detected in a current frame image. The at least one processor 130 may generate a first flow map indicating a magnitude of the first optical flow 1710, by executing the first flow map generation module 420.

In an embodiment, the operating method of the electronic device 100 may include a step S440 of generating a first correction flow map, by applying the first correction coefficient to the first flow map. The at least one processor 130 may generate a first correction flow map by correcting the first flow map, by executing a first correction flow map generation module 450. In an embodiment, the first correction flow map may include a plurality of correction magnitude coefficients obtained by correcting a plurality of magnitude coefficients through the first correction coefficient.

In an embodiment, the operating method of the electronic device 100 may include a step S450 of generating a second flow map indicating a direction of the first optical flow 1710 detected in the current frame image. The at least one processor 130 may generate a second flow map indicating a direction of the first optical flow 1710, by executing the second flow map generation module 430.

In an embodiment, the operating method of the electronic device 100 may include a step S460 of generating a second correction flow map, by applying the second correction coefficient to the second flow map. The at least one processor 130 may generate a second correction flow map by correcting the second flow map, by executing a second correction flow map generation module 460. In an embodiment, the second correction flow map may include a plurality of correction direction coefficients obtained by correcting a plurality of direction coefficients through the second correction coefficient.

In an embodiment, the operating method of the electronic device 100 may include the step S520 of generating a final correction flow map, based on the first correction flow map and the second correction flow map. The at least one processor 130 may generate a final correction flow map based on the first correction flow map and the second correction flow map, by executing a final correction flow map generation module 470. The at least one processor 130 may generate a final correction flow map based on the plurality of correction magnitude coefficients included in the first correction flow map and the plurality of correction direction coefficients included in the second correction flow map. The final correction flow map may include a plurality of final correction flow blocks respectively corresponding to a plurality of blocks, and a plurality of final correction adjustment coefficients respectively corresponding to the plurality of final correction flow blocks.

In an embodiment, the at least one processor 130 may calculate a plurality of final correction adjustment coefficients using a weighted average of a value obtained by multiplying the plurality of correction magnitude coefficients included in the first correction flow map by a first weight and a value obtained by multiplying the plurality of correction direction coefficients included in the second correction flow map by a second weight. In an embodiment, the final correction adjustment coefficients may have different values due to the first correction coefficient and the second correction coefficient from final adjustment coefficients included in a final flow map.

In an embodiment, the operating method of the electronic device 100 may include a step S630 of adjusting a luminance of the image 500 generated based on the input image 400 to be lowered, according to the final correction flow map. The at least one processor 130 may adjust a luminance of the image 500 generated based on the input image 400 to be lowered, by executing the image adjustment module 126.

In an embodiment, the operating method of the electronic device 100 may further include a step of calculating a correction luminance coefficient, based on the final correction flow map. In the step of calculating a correction luminance coefficient, the at least one processor 130 may obtain a correction luminance coefficient, by calculating an average value of the plurality of final correction adjustment coefficients included in the final correction flow map, by executing the coefficient calculation module 124.

In an embodiment, in the step S630 of adjusting a luminance of the image 500 to be lowered, a luminance of the image 500 may be adjusted to be lowered according to the correction luminance coefficient.

According to perception characteristics of a person, as a change in a movement speed or a movement direction of a moving object included in the image 500 increases, a luminance reduction of the image 500 may not be perceived by the user 200. Accordingly, when a movement speed of a moving object included in the input image 400 increases in a current frame compared to a movement speed of the moving object in an immediately preceding frame or an average of a movement speed of the moving object from a first frame to the immediately preceding frame, a degree of lowering a luminance of the image 500 may be increased by increasing a magnitude of the first correction coefficient, thereby reducing power consumption of the electronic device 100, increasing a usage time of the battery, and preventing/reducing image quality degradation of the image 500 from being perceived by the user 200. Also, when a movement direction of a moving object included in the input image 400 changes in a current frame compared to a movement direction of the moving object in an immediately preceding frame or an average of a movement direction of the moving object from a first frame to the immediately preceding frame, a degree of lowering a luminance of the image 500 may be increased by increasing a magnitude of the second correction coefficient, thereby reducing power consumption of the electronic device 100, increasing a usage time of the battery, and preventing/reducing image quality degradation of the image 500 from being perceived by the user 200.

Figure 18:
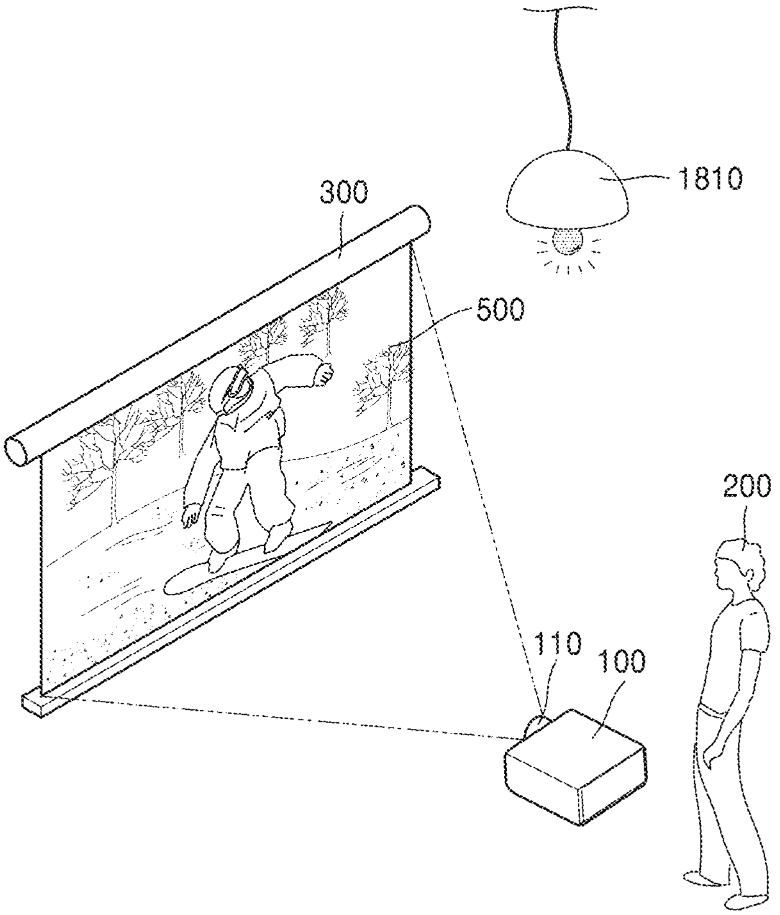
FIG. 18 is a diagram illustrating an example operation of controlling a brightness of at least one external lighting device according to a final flow map, according to various embodiments.

FIG. 18 is a diagram illustrating an example of controlling a brightness of at least one external lighting device according to a final flow map, according to various embodiments. The same elements and steps as those described with reference to FIGS. 1 and 6 are denoted by the same reference numerals, and thus a repeated description thereof may not be provided here.

Referring to FIG. 18, in an embodiment, a separate external light device 1810 for providing light may be located in an environment around the user 200 using the electronic device 100 for displaying the image 500 on the screen 300 through the image display unit 110. In an embodiment, although the external lighting device 1810 is a lighting device in FIG. 18, the present disclosure is not limited thereto. The external lighting device 1810 may include a television or the like for displaying an image.

Although one external lighting device 1810 is located in the environment around the user 200 in FIG. 18, the present disclosure is not limited thereto and two or more external lighting devices may be located in the environment around the user 200.

In an embodiment, an operation of the external lighting device 1810 may be controlled through the Internet of Things (IoT). In an embodiment, the external lighting device 1810 may include a separate communication interface, and may perform data communication with an external server through the separate communication interface. The external lighting device 1810 may obtain a signal for controlling a brightness of light provided by the external lighting device 1810 from the external server through the separate communication interface and may adjust a brightness of light according to the obtained signal.

In an embodiment, the electronic device 100 may perform data communication with the external server through the communication interface 170. In an embodiment, when the electronic device 100 adjusts a luminance of the image 500 to be lowered in order to reduce power consumption, the electronic device 100 may provide a control signal for lowering a brightness of light provided by the external lighting device 1810 to the external lighting device 1810 through the external server. In an embodiment, the electronic device 100 may control a brightness of light provided by the external lighting device 1810 through the communication interface 170 according to a generated final flow map. In an embodiment, the electronic device 100 may provide a control signal to the external lighting device 1810 so that as a magnitude of a luminance coefficient calculated according to the final flow map increases, a degree of lowering a brightness of light provided by the external lighting device 1810 increases. In an embodiment, when the external lighting device 1810 obtains the control signal, the external lighting device 1810 may lower a brightness of provided light.

Accordingly, even when a luminance of the image 500 displayed on the screen 300 is lowered, a brightness of light provided by the external lighting device 1810 located in the environment of the user 200 may be lowered, thereby preventing/reducing visibility of the user 200 from being reduced.

Figure 19:
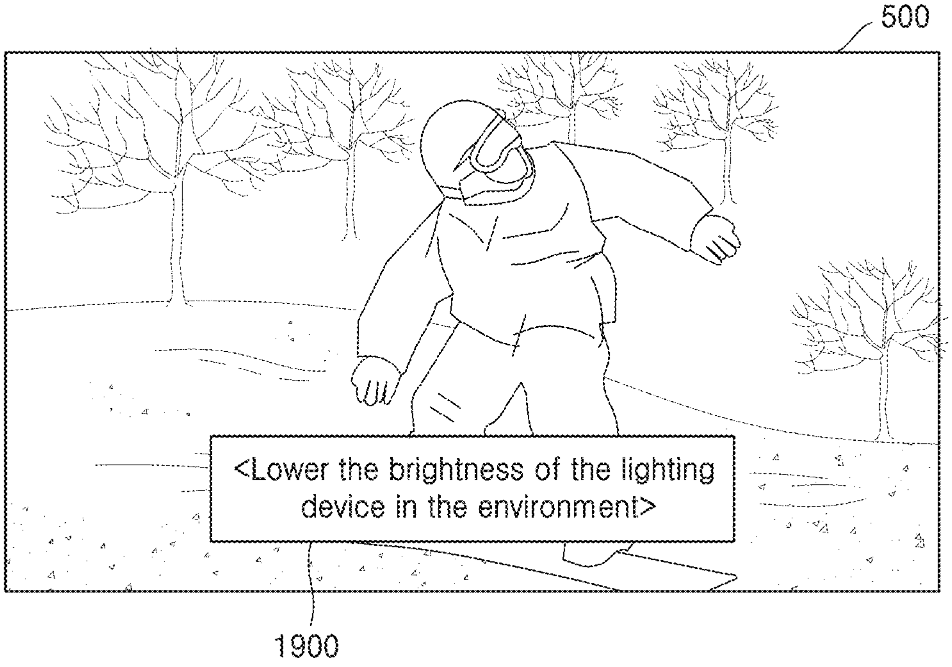
FIG. 19 is a diagram for illustrating an example operation of displaying a notification to control a brightness of an external lighting device according to a final flow map, according to various embodiments.

FIG. 19 is a diagram illustrating an example operation of displaying a notification to control a brightness of an external lighting device according to a final flow map, according to various embodiments.

Referring to FIGS. 1, 18, and 19, in an embodiment, when the electronic device 100 displays the image 500 by lowering a luminance of the image 500 in order to reduce power consumption and increase a usage time of the battery, the electronic device 100 may display a notification on the screen 300 and provide the notification to the user 200.

In an embodiment, the electronic device 100 may provide a notification 1900 on the screen 300 to lower a brightness of the external lighting device 1810 in the environment of the user 200, such as "Lower the brightness of the lighting device in the environment". In an embodiment, when the external lighting device 1810 is controlled by the IoT and a luminance of the image 500 displayed by the electronic device 100 is lowered, a brightness of the external lighting device 1810 may be lowered without the control of the user 200. Even in this case, the notification 1900 may be displayed to inform the user 200 that a brightness of the external lighting device 1810 is lowered.

In an embodiment, when the external lighting device 1810 is not controlled by the IoT, the user 200 may lower a brightness of the external lighting device 1810 through the notification 1900.

In an embodiment, the electronic device 100 may provide a notification such as 'the luminance of the image has been adjusted", to inform the user 200 that a luminance of the image 500 has been adjusted to be lowered in order to reduce power consumption and increase a usage time of the battery.

To address the technical problems, in an example embodiment, an electronic device for displaying an image may include: an image display unit comprising circuitry configured to display an image, a memory in which at least one instruction is stored, and at least one processor, comprising processing circuitry, individually and/or collectively, configured to execute the at least one instruction stored in the memory, and to control the electronic device to: obtain an input image through an input/output interface; detect an optical flow indicating movement of an object included in the input image, based on a power control signal being obtained by executing a battery check module stored in the memory; and operate in a low-power mode in which a luminance of an image generated based on the input image is adjusted to be lowered, based on a magnitude and a direction of the detected optical flow.

In an example embodiment, at least one processor, individually and/or collectively, may be configured to control the electronic device to: generate a first flow map indicating the magnitude of the detected optical flow and a second flow map indicating the direction of the detected optical flow; generate a final flow map based on the first flow map and the second flow map; and adjust a luminance of the image to be lowered in the low-power mode, according to the final flow map.

In an example embodiment, at least one processor, individually and/or collectively, may be configured to generate the final flow map using a weighted average of the first flow map and the second flow map calculated by multiplying the first flow map by a first weight and multiplying the second flow map by a second weight, wherein a magnitude of the second weight and a magnitude of the first weight may be different from each other.

In an example embodiment, the optical flow may include a plurality of sub-optical flows. At least one processor, individually and/or collectively, may be configured to: divide the input image into a plurality of blocks; detect the plurality of sub-optical flows respectively corresponding to the plurality of blocks; generate the first flow map including a plurality of first flow blocks respectively corresponding to the plurality of blocks, and a plurality of magnitude coefficients indicating magnitudes of the plurality of sub-optical flows respectively corresponding to the plurality of first flow blocks; generate the second flow map indicating a plurality of second flow blocks respectively corresponding to the plurality of blocks, and a plurality of direction coefficients indicating directions of the plurality of sub-optical flows respectively corresponding to the plurality of second flow blocks; and generate the final flow map including a plurality of final flow blocks respectively corresponding to the plurality of blocks, and a plurality of final adjustment coefficients based on the plurality of magnitude coefficients and the plurality of direction coefficients respectively corresponding to the plurality of flow blocks, based on the first flow map and the second flow map.

In an example embodiment, at least one processor, individually and/or collectively, may be configured to: calculate a luminance coefficient having an average value of the plurality of final adjustment coefficients included in the final flow map; and adjust a luminance of the image to be lowered in the low-power mode, according to the luminance coefficient, wherein as a magnitude of the luminance coefficient increases, an amount by which a luminance of the image is adjusted to be lowered may increase.

In an example embodiment, each of the plurality of magnitude coefficients included in the plurality of first flow blocks may be proportional to a magnitude of each of the plurality of sub-optical flows included in the plurality of first flow blocks. Each of the plurality of direction coefficients included in the plurality of second flow blocks may be proportional to a difference between an average of directions of a plurality of sub-optical flows included in a plurality of second flow blocks adjacent to each second flow block and a direction of a sub-optical flow included in each second flow block.

In an example embodiment, the input image may include a plurality of frame images respectively corresponding to a plurality of frames. At least one processor, individually and/or collectively, may be configured to: calculate a first adjustment coefficient by comparing a magnitude of at least one previous optical flow detected based on at least one previous frame image with a magnitude of a current optical flow detected based on a current frame image; calculate a second adjustment coefficient by comparing a direction of the at least one previous optical flow detected based on the at least one previous frame image with a direction of the current optical flow detected based on the current frame image; generate a first adjustment flow map by applying the first adjustment coefficient to the first flow map; generate a second adjustment flow map by applying the second adjustment coefficient to the second flow map; generate a final adjustment flow map based on the first adjustment flow map and the second adjustment flow map; and adjust a luminance of the image to be lowered in the low-power mode according to the final adjustment flow map, wherein a magnitude of the first adjustment coefficient may be proportional to a difference between a magnitude of the previous optical flow and a magnitude of the current optical flow, and a magnitude of the second adjustment coefficient may be proportional to a difference between a direction of the previous optical flow and a direction of the current optical flow.

In an example embodiment, at least one processor, individually and/or collectively, may be configured adjust at least one of a contrast ratio or a color of the image, based on the magnitude and the direction of the detected optical flow.

In an example embodiment, at least one processor, individually and/or collectively, may be configured to: adjust a frame rate at which the image is displayed, based on the magnitude and the direction of the detected optical flow; and adjust a frame rate to be increased as a luminance of the image is lowered, based on the magnitude and the direction of the detected optical flow.

In an example embodiment, the electronic device may further include a communication interface comprising communication circuitry. At least one processor, individually and/or collectively, may be configured to control a brightness of at least one external lighting device through the communication interface, based on the magnitude and the direction of the detected optical flow.

To address the above technical problems, in an example embodiment, a method of operating an electronic device for displaying an image is provided. The method of operating the electronic device may include: obtaining an input image through an input/output interface; detecting an optical flow indicating movement of an object included in the input image, based on a power control signal being obtained by executing a battery check module stored in a memory; and operating in a low-power mode in which a luminance of an image generated based on the input image is adjusted to be lowered, based on a magnitude and a direction of the detected optical flow.

In an example embodiment, the method of operating the electronic device may include: generating a first flow map indicating the magnitude of the detected optical flow and a second flow map indicating the direction of the detected optical flow; and generating a final flow map based on the first flow map and the second flow map, wherein the operating in the low-power mode may include adjusting a luminance of the image to be lowered according to the final flow map.

In an example embodiment, in the method of operating the electronic device, the generating of the final flow map may include: generating the final flow map using a weighted average of the first flow map and the second flow map calculated by multiplying the first flow map by a first weight and multiplying the second flow map by a second weight, wherein a magnitude of the second weight and a magnitude of the first weight may be different from each other.

In an example embodiment, the optical flow may include a plurality of sub-optical flows. The method of operating the electronic device may further include: dividing the input image into a plurality of blocks, wherein the detecting of the optical flow of the input image may include detecting the plurality of sub-optical flows respectively corresponding to the plurality of blocks; the generating of the first flow map and the second flow map may include generating the first flow map including a plurality of first flow blocks respectively corresponding to the plurality of blocks, and a plurality of magnitude coefficients indicating magnitudes of the plurality of sub-optical flows respectively corresponding to the plurality of first flow blocks; the generating of the first flow map and the second flow map may include generating the second flow map including a plurality of second flow blocks respectively corresponding to the plurality of blocks, and a plurality of direction coefficients indicating directions of the plurality of sub-optical flows respectively corresponding to the plurality of second flow blocks; and the generating of the final flow map may include generating the final flow map including a plurality of final flow blocks respectively corresponding to the plurality of blocks, and a plurality of final adjustment coefficients based on the plurality of magnitude coefficients and the plurality of direction coefficients respectively corresponding to the plurality of final flow blocks based on the first flow map and the second flow map.

In an example embodiment, the method of operating the electronic device may further include: calculating a luminance coefficient having an average value of the plurality of final adjustment coefficients included in the final flow map. In the method of operating the electronic device, the operating in the low-power mode may include adjusting a luminance of the image to be lowered according to the luminance coefficient. As a magnitude of the luminance coefficient increases, an amount by which a luminance of the image is adjusted to be lowered may increase.

In an example embodiment, each of the plurality of magnitude coefficients included in the plurality of first flow blocks may be proportional to a magnitude of each of the plurality of sub-optical flows included in the plurality of first flow blocks. Each of the plurality of direction coefficients included in the plurality of second flow blocks may be proportional to a difference between an average of directions of a plurality of sub-optical flows included in a plurality of second flow blocks adjacent to each second flow block and a direction of a sub-optical flow included in each second flow block.

In an example embodiment, the input image may include a plurality of frame images respectively corresponding to a plurality of frames. The method of operating the electronic device may include: calculating a first correction coefficient by comparing a magnitude of at least one previous optical flow detected based on at least one frame image with a magnitude of a current optical flow detected based on a current frame image; calculating a second correction coefficient by comparing a direction of the at least one previous optical flow detected based on the at least one previous frame image with a direction of the current optical flow detected based on the current frame image; generating a first correction flow map by applying the first correction coefficient to the first flow map; generating a second correction flow map by applying the second correction coefficient to the second flow map; generating a final correction flow map based on the first correction flow map and the second correction flow map, wherein the operating in the low-power mode may further include adjusting a luminance of the image to be lowered according to the final correction flow map. A magnitude of the first correction coefficient may be proportional to a difference between a magnitude of the previous optical flow and a magnitude of the current optical flow, and a magnitude of the second correction coefficient may be proportional to a difference between a direction of the previous optical flow and a direction of the current optical flow.

In an example embodiment, in the method of operating the electronic device, the operating in the low-power mode may include adjusting at least one of a contrast ratio or a color of the image, based on the magnitude and the direction of the detected optical flow.

In an example embodiment, in the method of operating the electronic device, the operating in the low-power mode may include adjusting a frame rate at which the image is displayed, based on the magnitude and the direction of the detected optical flow. The method of operating the electronic device may include adjusting the frame rate to be increased as a luminance of the image is lowered, based on the magnitude and the direction of the detected optical flow.

According to an example embodiment of the present disclosure, there may be provided a non-transitory computer-readable recording medium having recorded thereon a program for performing at least one of embodiments of the operating method on a computer.

A program executed by the electronic device described in the present disclosure may be implemented as a hardware component, a software component, and/or a combination of a hardware component and a software component. The program may be executed by any system capable of executing computer-readable instructions.

Software may include a computer program, code, instructions, or a combination of one or more thereof, and may configure a processing device to operate as desired or instruct the processing device independently or collectively.

The software may be implemented as a computer program including instructions stored in a computer-readable storage medium. Examples of the computer-readable recording medium include a magnetic storage medium (e.g., a read-only memory (ROM), a random-access memory (RAM), a floppy disk, or a hard disk) and an optical recording medium (e.g., a compact disc ROM (CD-ROM) or a digital versatile disc (DVD)). The computer-readable recording medium may be distributed in computer systems connected in a network so that computer-readable code is stored and executed in a distributed fashion. The recording medium may be computer-readable, may be stored in a memory, and may be executed by a processor.

The computer-readable storage medium may be provided in the form of a non-transitory storage medium. Here, a 'non-transitory' storage medium does not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

A program according to embodiments of the present disclosure may be provided in a computer program product. The computer program product may be a product purchasable between a seller and a purchaser.

The computer program product may include a software program and a computer-readable storage medium in which the software program is stored. For example, the computer program product may include a product (e.g., a downloadable application) that is electronically distributed as a software program through an electronic market (e.g., Samsung Galaxy Store) or a manufacturer of an electronic device. For electronic distribution, at least a part of the software program may be stored in a storage medium or may be temporarily generated. In this case, the storage medium may be a storage medium of a server of the manufacturer of the electronic device, a server of the electronic market, or a relay server that temporarily stores the software program.

Although the various example embodiments have been illustrated and described, various modifications and variations are possible by one of ordinary skill in the art from the above description. For example, the described techniques may be performed in a different order from the described method, and/or the described elements such as a computer system and a module may be combined or integrated in a different form from the described method, or may be replaced or substituted by other elements or equivalents to achieve appropriate results. It will also be understood that any of the embodiment(s) described herein may be used in conjunction with any other embodiment(s) described herein.

What is claimed is:

1. An electronic device for displaying an image, the electronic device comprising:

an image display unit comprising circuitry configured to display an image;

a memory in which at least one instruction is stored; and at least one processor, comprising processing circuitry, individually and/or collectively, configured to execute the at least one instruction stored in the memory and to cause the electronic device to:

obtain an input image through an input/output interface, detect an optical flow indicating movement of an object included in the input image, based on a power control signal being obtained by executing a battery check module stored in the memory, and operate in a low-power mode in which a luminance of an image generated based on the input image is adjusted to be lowered, based on a magnitude and a direction of the detected optical flow.

2. The electronic device of claim 1, wherein at least one processor, individually and/or collectively, is configured to:

generate a first flow map indicating the magnitude of the detected optical flow and a second flow map indicating the direction of the detected optical flow, generate a final flow map based on the first flow map and the second flow map, and adjust the luminance of the image to be lowered in the low-power mode according to the final flow map.

3. The electronic device of claim 2, wherein at least one processor, individually and/or collectively, is configured to: generate the final flow map using a weighted average of the first flow map and the second flow map calculated by multiplying the first flow map by a first weight and multiplying the second flow map by a second weight, wherein a magnitude of the second weight and a magnitude of the first weight are different from each other.

4. The electronic device of claim 2, wherein the optical flow comprises a plurality of sub-optical flows, wherein a at least one processor, individually and/or collectively, is configured to:

divide the input image into a plurality of blocks, detect the plurality of sub-optical flows respectively corresponding to the plurality of blocks, generate the first flow map comprising a plurality of first flow blocks respectively corresponding to the plurality of blocks, and a plurality of magnitude coefficients indicating magnitudes of the plurality of sub-optical flows respectively corresponding to the plurality of first flow blocks, generate the second flow map comprising a plurality of second flow blocks respectively corresponding to the plurality of blocks, and a plurality of direction coefficients indicating directions of the plurality of sub-optical flows respectively corresponding to the plurality of second flow blocks, and generate the final flow map comprising a plurality of final flow blocks respectively corresponding to the plurality of blocks, and a plurality of final adjustment coefficients based on the plurality of magnitude coefficients and the plurality of direction coefficients respectively corresponding to the plurality of final flow blocks, based on the first flow map and the second flow map.

5. The electronic device of claim 4, wherein at least one processor, individually and/or collectively, is configured to:

calculate a luminance coefficient having an average value of the plurality of final adjustment coefficients included in the final flow map, and adjust the luminance of the image to be lowered in the low-power mode, according to the luminance coefficient, wherein as a magnitude of the luminance coefficient increases, an amount by which the luminance of the image is adjusted to be lowered increases.

6. The electronic device of claim 4, wherein each of the plurality of magnitude coefficients included in the plurality of first flow blocks is proportional to a magnitude of each of the plurality of sub-optical flows included in the plurality of first flow blocks, and each of the plurality of direction coefficients included in the plurality of second flow blocks is proportional to a difference between an average of directions of a plurality of sub-optical flows included in the second flow blocks adjacent to each second flow block and a direction of a sub-optical flow included in each second flow block.

7. The electronic device of claim 2, wherein the input image comprises a plurality of frame images respectively corresponding to a plurality of frames, wherein at least one processor, individually and/or collectively, is configured to:

calculate a first adjustment coefficient by comparing a magnitude of at least one previous optical flow detected based on at least one previous frame image with a magnitude of a current optical flow detected based on a current frame image, calculate a second adjustment coefficient by comparing a direction of the at least one previous optical flow detected based on the at least one previous frame image with a direction of the current optical flow detected based on the current frame image, generate a first adjustment flow map by applying the first adjustment coefficient to the first flow map, generate a second adjustment flow map by applying the second adjustment coefficient to the second flow map, generate a final adjustment flow map based on the first adjustment flow map and the second adjustment flow map, and adjust the luminance of the image to be lowered in the low-power mode according to the final adjustment flow map, wherein a magnitude of the first adjustment coefficient is proportional to a difference between a magnitude of the previous optical flow and a magnitude of the current optical flow, and a magnitude of the second adjustment coefficient is proportional to a difference between a direction of the previous optical flow and a direction of the current optical flow.

8. The electronic device of claim 1, wherein at least one processor, individually and/or collectively, is configured to:

adjust at least one of a contrast ratio or a color of the image, based on the magnitude and the direction of the detected optical flow.

9. The electronic device of claim 1, wherein at least one processor, individually and/or collectively, is configured to: adjust a frame rate at which the image is displayed, based on the magnitude and the direction of the detected optical flow, wherein the frame rate is adjusted to be increased as the luminance of the image is lowered, based on the magnitude and the direction of the detected optical flow.

10. The electronic device of claim 1, further comprising a communication interface, comprising communication circuitry;

wherein at least one processor, individually and/or collectively, is configured to control a brightness of at least one external lighting device through the communication interface, based on the magnitude and the direction of the detected optical flow.

11. A method of operating an electronic device for displaying an image, the method comprising:

obtaining an input image through an input/output interface;

detecting an optical flow indicating movement of an object included in the input image, based on a power control signal being obtained by executing a battery check module stored in a memory; and operating in a low-power mode in which a luminance of an image generated based on the input image is adjusted to be lowered, based on a magnitude and a direction of the detected optical flow.

12. The method of claim 11, further comprising:

generating a first flow map indicating the magnitude of the detected optical flow and a second flow map indicating the direction of the detected optical flow; and generating a final flow map based on the first flow map and the second flow map, wherein the operating in the low-power mode comprises:

adjusting the luminance of the image to be lowered according to the final flow map.

13. The method of claim 12, wherein the generating of the final flow map comprises: generating the final flow map using a weighted average of the first flow map and the second flow map calculated by multiplying the first flow map by a first weight and multiplying the second flow map by a second weight, wherein a magnitude of the second weight and a magnitude of the first weight are different from each other.

14. The method of claim 12, wherein the optical flow comprises a plurality of sub-optical flows, wherein the operating method further comprises dividing the input image into a plurality of blocks, wherein the detecting of the optical flow of the input image comprises detecting the plurality of sub-optical flows respectively corresponding to the plurality of blocks, wherein the generating of the first flow map and the second flow map comprises:

generating the first flow map comprising a plurality of first flow blocks respectively corresponding to the plurality of blocks, and a plurality of magnitude coefficients indicating magnitudes of the plurality of sub-optical flows respectively corresponding to the plurality of first flow blocks; and generating the second flow map comprising a plurality of second flow blocks respectively corresponding to the plurality of blocks, and a plurality of direction coefficients indicating directions of the plurality of sub-optical flows respectively corresponding to the plurality of second flow blocks, and the generating of the final flow map comprises generating the final flow map comprising a plurality of final flow blocks respectively corresponding to the plurality of blocks, and a plurality of final adjustment coefficients based on the plurality of magnitude coefficients and the plurality of direction coefficients respectively corresponding to the plurality of final flow blocks, based on the first flow map and the second flow map.

15. The method of claim 14, further comprising:

calculating a luminance coefficient having an average value of the plurality of final adjustment coefficients included in the final flow map;

wherein the operating in the low-power mode comprises:

adjusting a luminance of the image to be lowered according to the luminance coefficient, as a magnitude of the luminance coefficient increases, an amount by which a luminance of the image is adjusted to be lowered increases.

16. The method of claim 14, wherein each of the plurality of magnitude coefficients included in the plurality of first flow blocks is proportional to a magnitude of each of the plurality of sub-optical flows included in the plurality of first flow blocks, wherein each of the plurality of direction coefficients included in the plurality of second flow blocks is proportional to a difference between an average of directions of a plurality of sub-optical flows included in a plurality of second flow blocks adjacent to each second flow block and a direction of a sub-optical flow included in each second flow block.

17. The method of claim 12, wherein the input image comprises a plurality of frame images respectively corresponding to a plurality of frames, wherein the operating method further comprises:

calculating a first correction coefficient by comparing a magnitude of at least one previous optical flow detected based on at least one frame image with a magnitude of a current optical flow detected based on a current frame image;

calculating a second correction coefficient by comparing a direction of the at least one previous optical flow detected based on the at least one previous frame image with a direction of the current optical flow detected based on the current frame image;

generating a first correction flow map by applying the first correction coefficient to the first flow map;

generating a second correction flow map by applying the second correction coefficient to the second flow map;

generating a final correction flow map based on the first correction flow map and the second correction flow map;

wherein the operating in the low-power mode comprises adjusting a luminance of the image to be lowered according to the final correction flow map, wherein a magnitude of the previous optical flow and a magnitude of the current optical flow, and a magnitude of the second correction coefficient is proportional to a difference between a direction of the previous optical flow and a direction of the current optical flow.

18. The method of claim 11, wherein the operating in the low-power mode comprises adjusting at least one of a contrast ratio or a color of the image, based on the magnitude and the direction of the detected optical flow.

19. The method of claim 11, wherein the operating in the low-power mode comprises:

adjusting a frame rate at which the image is displayed, based on the magnitude and the direction of the detected optical flow, wherein the frame rate is adjusted to be increased as a luminance of the image is lowered.

20. A non-transitory computer-readable recording medium having recorded thereon a program for performing the method of claim 11 on a computer.

* * * * *